United States Patent
Kondoh et al.

(10) Patent No.: US 10,354,209 B2
(45) Date of Patent: Jul. 16, 2019

(54) SERVICE PROVIDING SYSTEM AND LOG INFORMATION PROVIDING METHOD

(71) Applicants: Naritake Kondoh, Kanagawa (JP); Sachiko Takeuchi, Tokyo (JP)

(72) Inventors: Naritake Kondoh, Kanagawa (JP); Sachiko Takeuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 344 days.

(21) Appl. No.: 14/707,100

(22) Filed: May 8, 2015

(65) Prior Publication Data
US 2015/0370847 A1   Dec. 24, 2015

(30) Foreign Application Priority Data
Jun. 18, 2014  (JP) .................. 2014-125025

(51) Int. Cl.
G06F 7/00    (2006.01)
G06F 17/30   (2006.01)
(Continued)

(52) U.S. Cl.
CPC ............. G06Q 10/06 (2013.01); G06F 17/40 (2013.01)

(58) Field of Classification Search
CPC ................ G06Q 10/06; G06F 17/40
(Continued)

(56) References Cited

U.S. PATENT DOCUMENTS 9,389,818 B2    7/2016  Akutsu
2002/0165872 A1*  11/2002  Meltzer ............. G06Q 10/06
                                              715/205
(Continued)

FOREIGN PATENT DOCUMENTS

JP    2009-009600    1/2009
JP    2010-063087    3/2010
(Continued)

OTHER PUBLICATIONS

Takanori Kawai, "Introduction to AWStats, Let's Obtain and Utilize Statistical Information", Web+DB Press, Gijutsu-Hyohron Co., Ltd., Sep. 20, 2003, vol. 16, pp. 140-146.
(Continued)

*Primary Examiner* — Tuan A Pham
*Assistant Examiner* — Thai V Dang
(74) *Attorney, Agent, or Firm* — IPUSA, PLLC

(57) ABSTRACT

A service providing system provides a service to a service usage device connected via a network. The service providing system is constituted by at least one information processing apparatus. The service providing system includes at least one log information storage unit configured to store log information relating to the service provided to the service usage device, in association with organization identification information of the service usage device; an organization information storage unit configured to store a standard time of an organization identified by the organization identification information; and a log information providing unit configured to collect the log information from the log information storage unit based on the organization identification information, correct time and date information included in the log information according to the standard time of the organization identified by the organization identification information, and subsequently provide the log information to a request source of the log information.

19 Claims, 22 Drawing Sheets

(51) Int. Cl.
  *G06Q 10/06* (2012.01)
  *G06F 17/40* (2006.01)
(58) Field of Classification Search
  USPC .................................................. 707/691
  See application file for complete search history.

(56) References Cited

U.S. PATENT DOCUMENTS

| | | | |
|---|---|---|---|
| 2007/0038889 A1* | 2/2007 | Wiggins | G05B 23/0264 |
| | | | 714/20 |
| 2007/0121151 A1* | 5/2007 | Uchida | G06F 21/608 |
| | | | 358/1.15 |
| 2008/0120129 A1* | 5/2008 | Seubert | G06Q 10/06 |
| | | | 705/35 |
| 2008/0133973 A1* | 6/2008 | Mizoe | G06Q 10/06 |
| | | | 714/37 |
| 2010/0036796 A1 | 2/2010 | Kajikawa et al. | |
| 2010/0088031 A1* | 4/2010 | Nielsen | G06Q 10/06 |
| | | | 702/5 |
| 2012/0179646 A1 | 7/2012 | Hinton et al. | |
| 2013/0003115 A1 | 1/2013 | Uchikawa | |
| 2015/0029535 A1 | 1/2015 | Kondoh et al. | |
| 2015/0029536 A1 | 1/2015 | Suzuki et al. | |
| 2015/0036167 A1 | 2/2015 | Naitoh et al. | |

FOREIGN PATENT DOCUMENTS

| | | |
|---|---|---|
| JP | 2012-208646 | 10/2012 |
| JP | 2013-012053 | 1/2013 |
| JP | 2013-025413 | 2/2013 |
| JP | 2014-502767 | 2/2014 |
| JP | 2015-026231 | 2/2015 |
| JP | 2015-026232 | 2/2015 |
| JP | 2015-026288 | 2/2015 |
| JP | 2015-026334 | 2/2015 |
| JP | 2015-028704 | 2/2015 |
| JP | 2015-028740 | 2/2015 |
| JP | 2015-056168 | 3/2015 |

OTHER PUBLICATIONS

Takeshi Kobayashi, "Chapter 3, Functions/Analysis Solutions of Site Server 3.0", Back Office Magazine, CQ Publishing Co.,Ltd., Jul. 1, 1998, vol. 2, No. 7, pp. 133 to 139.

Office Action dated Jul. 3, 2018 issued with respect to the basic Japanese Patent Application No. 2014-125025.

Decision of rejection dated Jan. 29, 2019 issued with respect to the Japanese Patent Application No. 2014-125025.

* cited by examiner

FIG.4

| LICENSE TYPE | ID | REGISTRATION CODE | REGISTRATION STATE |
|---|---|---|---|
| TENANT | 10000 | AAA | REGISTERED |
| TENANT | 10001 | AAB | REGISTERED |
| TENANT | 10002 | AAC | NOT REGISTERED |
| PRINT SERVICE | 20000 | — | REGISTERED |
| PRINT SERVICE | 20001 | — | REGISTERED |
| PRINT SERVICE | 20002 | — | NOT REGISTERED |
| DISTRIBUTION SERVICE | 30000 | — | REGISTERED |
| DISTRIBUTION SERVICE | 30001 | — | REGISTERED |
| DISTRIBUTION SERVICE | 30002 | — | NOT REGISTERED |
| ... | ... | ... | ... |

FIG.5

| TENANT ID | NAME | SERVICE ID | SERVICE TYPE | VALIDITY PERIOD | EXTERNAL SERVICE | EXTERNAL SERVICE | ADDRESS INFORMATION | USAGE DISTRICT INFORMATION | TIME ZONE INFORMATION |
|---|---|---|---|---|---|---|---|---|---|
| 10000 | COMPANY A | 20000 | PRINT SERVICE | ONE YEAR | ONLINE STORAGE A | ONLINE STORAGE B | A@aaa.com | JAPAN | OSAKA, SAPPORO, TOKYO |
| | | 20001 | PRINT SERVICE | ONE YEAR | | | | | |
| | | 30000 | DISTRIBUTION SERVICE | ONE YEAR | | | | | |
| 10001 | COMPANY B | 30001 | DISTRIBUTION SERVICE | ONE YEAR | ONLINE STORAGE A | — | A@bbb.com | US | PACIFIC STANDARD TIME |
| ... | ... | ... | ... | ... | ... | ... | ... | ... | ... |

FIG.6

| TENANT ID | LOG-IN | | IN-HOUSE AUTHENTICATION | ONLINE STORAGE A | | ONLINE STORAGE B | | | | ADDRESS INFORMATION |
|---|---|---|---|---|---|---|---|---|---|---|
| | USER ID | PASSWORD | USER ID | ACCOUNT | PASSWORD | ACCOUNT | AUTHORIZA-TION TOKEN | SCOPE | | |
| 10000 | YAMADA | 123 | Yamada | YYamada | 1234 | yamada | aaaaa | aa, bb | | A@aaa.com |
| | SATOH | 456 | SatohY | Sato | 4567 | sato | bbbbb | aa | | B@aaa.com |
| | SUZUKI | 789 | SuzukiK | SUZUKI | 7890 | Suzuki | ccccc | bb, cc | | C@aaa.com |
| 10001 | SUZUKI | 111 | – | TSuzuki | 1111 | – | – | – | | A@bbb.com |
| | SASAKI | 222 | – | SASAKI | 222 | – | – | – | | D@bbb.com |
| ... | ... | ... | ... | ... | ... | ... | ... | ... | | ... |

FIG.7

| TENANT ID | DEVICE ID | SERVICE ID | SERVICE TYPE | USAGE START DATE | USAGE END DATE | ... |
|---|---|---|---|---|---|---|
| 10000 | 1 | 20000 | PRINT SERVICE | 2012/1/1 | 2012/12/31 | |
| | | 30000 | DISTRIBUTION SERVICE | 2012/6/1 | 2013/5/31 | |
| | 2 | 20001 | PRINT SERVICE | 2012/6/1 | 2013/5/31 | |
| 10001 | 3 | 30001 | DISTRIBUTION SERVICE | 2013/1/1 | 2013/12/31 | |
| ... | ... | ... | ... | ... | ... | ... |

FIG.8

| EXTERNAL SERVICE ID | SERVICE NAME | CLIENT ID | CLIENT SECRET | PRODUCT NAME | SCOPE | AUTHORIZATION DESTINATION URL | REDIRECT DESTINATION URL |
|---|---|---|---|---|---|---|---|
| 001 | ONLINE STORAGE A | | | | | | |
| 002 | ONLINE STORAGE B | ABCDE | XXXXX | Servece | aa | http://www.001.com/auth | http://www.XXX.com/callback |
| | | | | | bb | | |
| | | | | | cc | | |
| ... | ... | ... | ... | ... | ... | ... | ... |

FIG.16

| ITEM | VALUE | Event | | |
|---|---|---|---|---|
| | | PRINT DOCUMENT | DELETE DOCUMENT | EXPIRED |
| DEVICE ID | NIL/<DEVICE ID> | ○ | ○ | ○ |
| PRINT LANGUAGE | PCLXL/RPCS | ○ | ○ | ○ |
| TIME AND DATE | YYYY-MM-DDThh:MM:ss+TZD | ○ | ○ | ○ |
| OPERATOR | <User_id>/System | ○ | ○ | ○ |
| MEANS/REASON | PRINT/ MANUAL DELETION/ TERM EXCEEDED | ○ | ○ | ○ |
| User NAME | <User ID> | ○ | ○ | ○ |
| DOCUMENT NAME | <DOCUMENT NAME> | ○ | ○ | ○ |
| File Size(Byte) | <Data Size> | ○ | ○ | ○ |
| Page NUMBER | <Page NUMBER> | ○ | ○ | ○ |
| AGGREGATE | NIL (DO NOT AGGREGATE)/ 2 in 1/4 in 1/6 in 1/ 9 in 1/16 in 1/ | ○ | ○ | ○ |
| NUMBER OF COPIES (WHEN STORING) | 1~ | ○ | ○ | ○ |
| SINGLE-SIDED/ DOUBLE-SIDED (WHEN STORING) | SINGLE-SIDED/ DOUBLE-SIDED/ UNKNOWN | ○ | ○ | ○ |
| Color/MONOCHROME (WHEN STORING) | MONOCHROME/ Color/UNKNOWN | ○ | ○ | ○ |
| NUMBER OF COPIES (WHEN PRINTING) | 1~ | ○ | ○ | ○ |
| SINGLE-SIDED/ DOUBLE-SIDED (WHEN PRINTING) | SINGLE-SIDED/ DOUBLE-SIDED/ UNKNOWN | ○ | ○ | ○ |
| Color/MONOCHROME (WHEN PRINTING) | MONOCHROME/ Color/UNKNOWN | ○ | ○ | ○ |
| EXTERNAL AUTHENTICATION ID | NIL/<EXTERNAL AUTHENTICATION ID> | ○ | ○ | ○ |

FIG.19

| CORRECTION VALUE | TIME ZONE INFORMATION |
|---|---|
| (UTC+08:00) | KUALA LUMPUR, SINGAPORE |
| (UTC+08:00) | KRASNOYARSK |
| (UTC+08:00) | PERTH |
| (UTC+08:00) | TAIPEI |
| (UTC+08:00) | PEKING, CHONGQING, HONG KONG SPECIAL ADMINISTRATIVE REGION, URUMQI |
| (UTC+09:00) | IRKUTSK |
| (UTC+09:00) | SEOUL |
| (UTC+09:00) | OSAKA, SAPPORO, TOKYO |
| (UTC+09:30) | ADELAIDE |
| (UTC+09:30) | DARWIN |
| (UTC+10:00) | CANBERRA, MELBOURNE, SYDNEY |
| (UTC+10:00) | GUAM, PORT MORESBY |

FIG.21

| ADMINISTRATOR FUNCTION | | |
|---|---|---|
| LIST OF DOCUMENTS | DOWNLOAD LOG | |
| UPLOAD FILE | | |
| MAIL PRINT SETTING | CREATE FILE: | CREATE FILE |
| PRINT MANAGEMENT SETTING | CHARACTER CODE: | Sift-JIS ∨ |
| DOWNLOAD LOG ▲ | COMPLETION MAIL REPORT: | off |
| | CREATION STATE | – |
| | CREATION REQUEST TIME AND DATE | – |
| | Link | DOWNLOAD FILE |

⇅ UPDATE

FIG.22

DEAR ○○ ○○

YOU HAVE SUCCEEDED IN CREATING A DELETE LOG.
PLEASE CLICK THE FOLLOWING URL TO DOWNLOAD.

*A LOGIN SCREEN WILL BE DISPLAYED AFTER CLICKING, SO PLEASE LOG IN.
A DOWNLOAD DIALOGUE WILL BE DISPLAYED AFTER LOGGING IN.

DOWNLOAD URL ○○○
https://www.start.○○○.com/frcxprint/log?id=××××××××

○○ COMPANY LIMITED

SERVICE PROVIDING SYSTEM AND LOG INFORMATION PROVIDING METHOD

BACKGROUND OF THE INVENTION

1. Field of the Invention

The present invention relates to a service providing system and a log information providing method.

2. Description of the Related Art

In recent years, in image forming apparatuses such as printers and multifunction peripherals, log information such as a job log is stored, for the purpose of recognizing the usage status (see, for example, Patent Document 1).

For example, there are cases where a terminal device operated by an administrator has a function of downloading log information stored in an image forming apparatus such as a printer and a multifunction peripheral, via a network such as LAN. However, the conventional function of downloading log information is a technology assuming a private network within an office environment, for example.

Therefore, the conventional function of downloading log information does not assume downloading log information of providing services, for example, from a cloud environment to a service providing destination such as a user, an organization, a company, etc., as in log information of service providing in a cloud environment.

Therefore, by the conventional function of downloading log information, it has not been possible to download log information according to the service providing destination such as a user, an organization, a company, etc. Note that service providing from a cloud environment is one example of a service providing configuration. The log information is information expressing the history relevant to an event that has occurred at the service providing source such as the cloud environment.

Patent Document 1: Japanese Laid-Open Patent Publication No. 2010-63087

SUMMARY OF THE INVENTION

The present invention provides a service providing system and a log information providing method, in which one or more of the above-described disadvantages are eliminated.

According to an aspect of the present invention, there is provided a service providing system for providing a service to a service usage device connected via a network, the service providing system being constituted by at least one information processing apparatus for implementing various functions of the service providing system, the service providing system including at least one log information storage unit configured to store log information relating to the service provided to the service usage device, in association with organization identification information of the service usage device; an organization information storage unit configured to store a standard time of an organization identified by the organization identification information; and a log information providing unit configured to collect the log information from the log information storage unit based on the organization identification information, correct time and date information included in the log information according to the standard time of the organization identified by the organization identification information, and subsequently provide the log information to a request source of the log information.

According to an aspect of the present invention, there is provided a log information providing method executed in a service providing system for providing a service to a service usage device connected via a network, the service providing system being constituted by at least one information processing apparatus for implementing various functions of the service providing system, the log information providing method including storing, in at least one log information storage unit, log information relating to the service provided to the service usage device, in association with organization identification information of the service usage device; and collecting the log information from the log information storage unit based on the organization identification information, referring to an organization information storage unit storing a standard time of an organization identified by the organization identification information, correcting time and date information included in the log information according to the standard time of the organization identified by the organization identification information, and subsequently providing the log information to a request source of the log information.

According to an aspect of the present invention, there is provided a non-transitory computer-readable recording medium storing a program that causes a computer to execute a process performed in a service providing system for providing a service to a service usage device connected via a network, the service providing system being constituted by at least one information processing apparatus for implementing various functions of the service providing system, the process including collecting log information from at least one log information storage unit based on organization identification information, the log information relating to the service provided to the service usage device, the log information being stored in the log information storage unit in association with the organization identification information of the service usage device; and referring to an organization information storage unit storing a standard time of an organization identified by the organization identification information, correcting time and date information included in the log information according to the standard time of the organization identified by the organization identification information, and subsequently providing the log information to a request source of the log information.

BRIEF DESCRIPTION OF THE DRAWINGS

Other objects, features and advantages of the present invention will become more apparent from the following detailed description when read in conjunction with the accompanying drawings, in which:

FIG. 4 illustrates a configuration of an example of license information;

FIG. 5 illustrates a configuration of an example of tenant information;

FIG. 6 illustrates a configuration of an example of user information;

FIG. 7 illustrates a configuration of an example of device information;

FIG. 8 illustrates a configuration of an example of external service information;

FIG. 16 illustrates a configuration of an example of delete log information;

FIG. 19 is an example of a table associating time zone information with correction values;

FIG. 21 is an image diagram of another example of a delete log download screen; and FIG. 22 is an image diagram of an example of a completion mail indicating the completion of creating a file of the delete log information.

DETAILED DESCRIPTION OF THE PREFERRED EMBODIMENTS

A description is given, with reference to the accompanying drawings, of embodiments of the present invention.

First Embodiment

System Configuration

Figure 1:
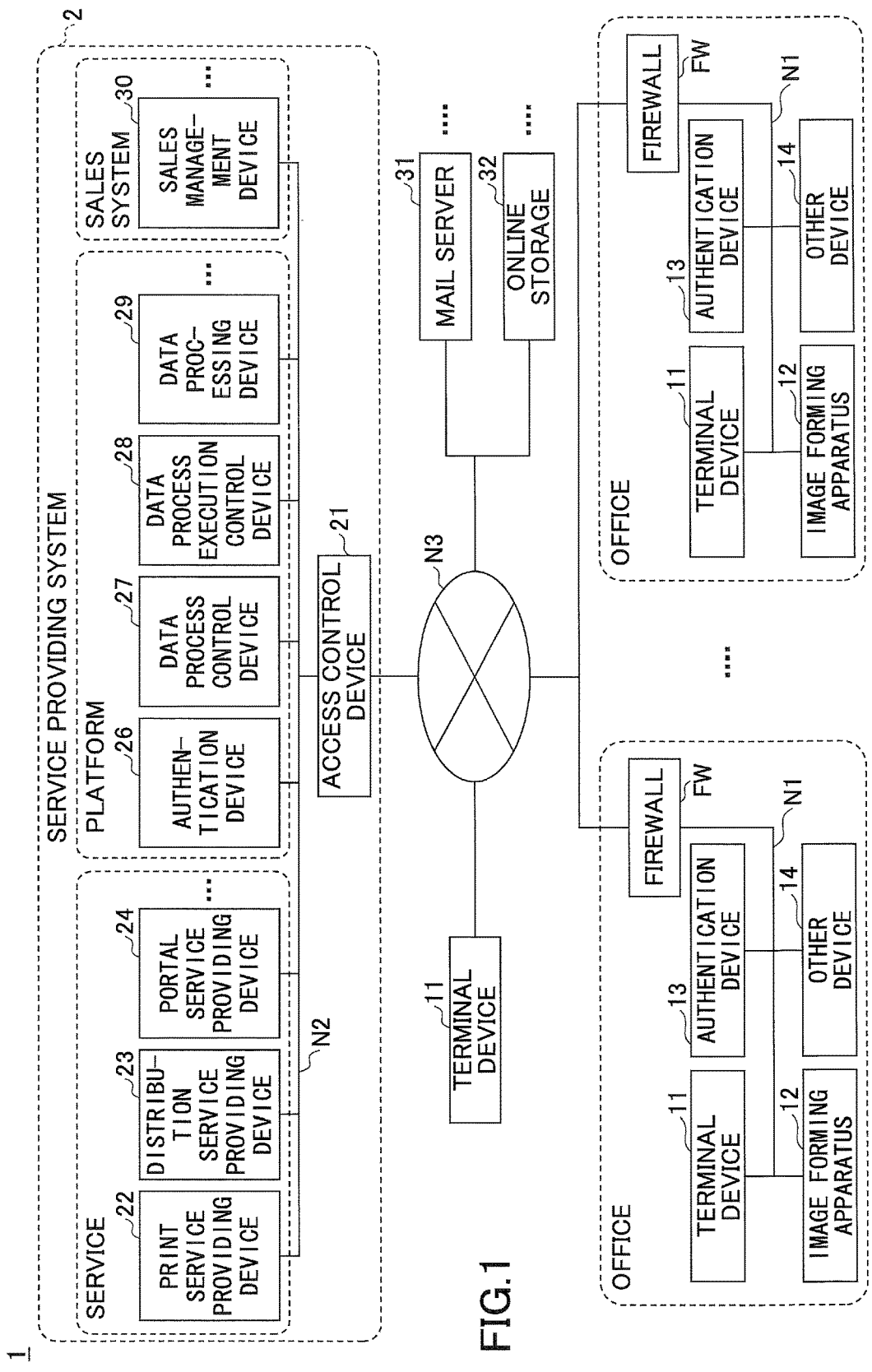
FIG. 1 is a configuration diagram of an example of an information processing system according to an embodiment.

FIG. 1 is a configuration diagram of an example of an information processing system according to the present embodiment. An information processing system 1 of FIG. 1 includes a private network N1 in an office, a network N2 of a service providing system 2 typified by a cloud service, and a network N3 such as the Internet. The networks N1 through N3 are examples of network environments.

In the network N1 in an office, a firewall FW is provided. The firewall FW restricts accesses from unauthorized access sources. In the network N2 of the service providing system 2, an access control device 21 is installed. The access control device 21 controls access via the network N3.

The network N1 in an office is a private network on the inner side of the firewall FW. To the network N1, a terminal device 11, an image forming apparatus 12, an authentication device 13, and another device 14 are connected.

The terminal device 11 is realized by an information processing apparatus (computer system) in which a general OS, etc., is installed. The terminal device 11 is a device that can be operated by the user, such as a PC, a tablet PC, a notebook PC, a smartphone, a mobile phone, etc.

The image forming apparatus 12 is a device having an image forming function, such as a multifunction peripheral, a copier, a scanner, a laser printer, etc. The authentication device 13 may be realized by an information processing apparatus in which a general OS, etc., is installed. The authentication device 13 provides a user authentication function. The other device 14 is a device such as a projector, an electronic blackboard device, etc.

Note that the terminal device 11, the image forming apparatus 12, the authentication device 13, and the other device 14 include a means for performing wireless communication or a means for performing wired communication. FIG. 1 illustrates an example in which one of each of the terminal device 11, the image forming apparatus 12, the authentication device 13, and the other device 14 is provided; however, there may be a plurality of each of these devices.

The service providing system 2 is a system that is constructed by a provider providing a cloud service, etc., via the network N3. Note that in the present embodiment, a description is given of an example of a cloud service; however, the present embodiment may be applied to other services provided via the network N3, such as a service provided by ASP (application service provider) and a web service.

The network N2 of the service providing system 2 is connected to the network N3 by the access control device 21. To the network N2, the access control device 21, a print service providing device 22, a distribution service providing device 23, a portal service providing device 24, an authentication device 26, a data process control device 27, a data process execution control device 28, a data processing device 29, and a sales management device 30 are connected.

Details of the print service providing device 22, the distribution service providing device 23, the portal service providing device 24, the authentication device 26, the data process control device 27, the data process execution control device 28, the data processing device 29, and the sales management device 30 are described below.

The devices in the service providing system 2 such as the access control device 21 and the print service providing device 22 are realized by one or more information processing apparatuses. That is to say, each of the devices in the service providing system 2 may be realized by a single information processing apparatus or may be realized by being distributed across a plurality of information processing apparatuses.

Note that the devices in the service providing system 2 may be realized by being integrated in a single computer. That is to say, the number of information processing apparatuses constituting the devices in the service providing system 2 does not limit the scope of the present invention.

Furthermore, some or all of the devices in the service providing system 2 may be realized in a private network such as the network N1 in an office. The information processing system 1 according to the present embodiment indicates a preferred example. For example, the scope of the present invention is not limited by whether there is a firewall between the service providing system 2 and the devices in the network N1 in an office that are accessed for using the service providing system 2.

The devices in the service providing system 2 may be roughly divided into devices for realizing a service providing function for providing various services, devices for realizing a platform function that can be commonly used when providing various services, and devices for realizing a sales management function of licenses. A sales management device 30, which is an example of a device for realizing a sales management function of licenses, is installed at each sales point of various services, and manages a license with respect to a service that has been sold to a user belonging to the sales area.

Note that the print service providing device 22, the distribution service providing device 23, and the portal service providing device 24 are examples of devices for realizing the service providing function for providing various services. The authentication device 26, the data process control device 27, the data process execution control device 28, and the data processing device 29 are examples of devices for realizing a platform function that can be commonly used when providing various services.

The method of roughly dividing the service providing system 2 described above is based on a conceptual perception for describing the present invention so as to be easily understood; however, the service providing system 2 need not be constituted based on such a perception.

Furthermore, to the network N3 such as the Internet, the terminal device 11, a mail server 31, an online storage 32, etc., are connected. As illustrated in FIG. 1, the terminal device 11 may be connected to a network other than the network N1 in an office. The information processing system 1 illustrated in FIG. 1 illustrates an example in which the terminal device 11 is connected to the network N1 in an office and to the network N3 such as the Internet.

The mail server 31 performs processes relevant to e-mails, such as transmitting and receiving e-mails of users. The online storage 32 performs processes relevant to a service of lending out a storage area of the storage. The mail server 31 and the online storage 32 are realized by one or more information processing apparatuses.

<Hardware Configuration>

Figure 2:
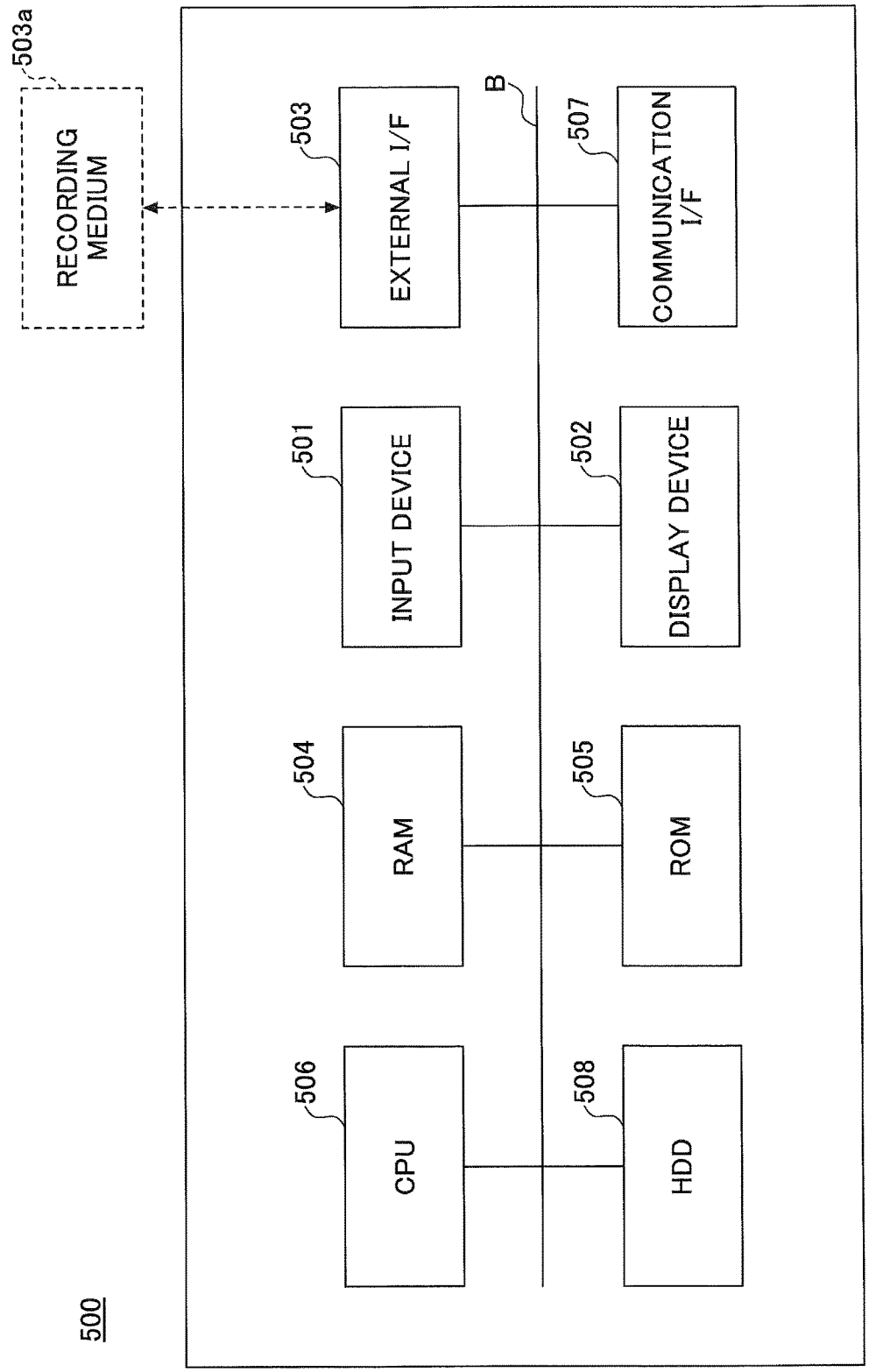
FIG. 2 is a hardware configuration diagram of an example of a computer system according to an embodiment.

The terminal device 11 and the authentication device 13 of FIG. 1 are realized by a computer system having a hardware configuration as illustrated in FIG. 2, for example. Similarly, the devices in the service providing system 2 such as the access control device 21 and the print service providing device 22 of FIG. 1 are also realized by a computer system having a hardware configuration as illustrated in FIG. 2, for example. The mail server 31 and the online storage 32 of FIG. 1 are also realized by a computer system having a hardware configuration as illustrated in FIG. 2, for example. FIG. 2 is a hardware configuration diagram of an example of a computer system according to the present embodiment.

A computer system 500 illustrated in FIG. 2 includes an input device 501, a display device 502, an external I/F 503, a RAM 504, a ROM 505, a CPU 506, a communication I/F 507, and a HDD 508, which are interconnected by a bus B.

The input device 501 includes a keyboard, a mouse, and a touch panel, and is used by the user for inputting various operation signals. The display device 502 includes a display, etc., and displays processing results obtained by the computer system 500.

The communication I/F 507 is an interface that connects the computer system 500 to networks N1 through N3. Accordingly, the computer system 500 is able to perform data communication via the communication I/F 507.

The HDD 508 is an example of a non-volatile storage device for storing programs and data. The stored programs and data include an OS that is the basic software for controlling the entire computer system 500, and application software for providing various functions in the OS.

The external I/F 503 is an interface between the computer system 500 and an external device. An example of the external device is a recording medium 503*a*. Accordingly, the computer system 500 is able to read and/or write in the recording medium 503*a* via the external I/F 503. Examples of the recording medium 503*a* are a flexible disk, a CD, a DVD, an SD memory card, and a USB memory.

The ROM 505 is an example of a non-volatile semiconductor memory (storage device) that can store programs and data even after the power is turned off. The ROM 505 stores programs and data such as a BIOS that is executed when the computer system 500 is activated, OS settings, and network settings. The RAM 504 is an example of a volatile semiconductor memory (storage device) for temporarily storing programs and data.

The CPU 506 is a processor for controlling the entire computer system 500 and realizing functions of the computer system 500, by loading the programs and data from the storage devices such as the ROM 505 and the HDD 508, into the RAM 504, and executing processes.

<Software Configuration>

<<Service Providing System>>

Figure 3:
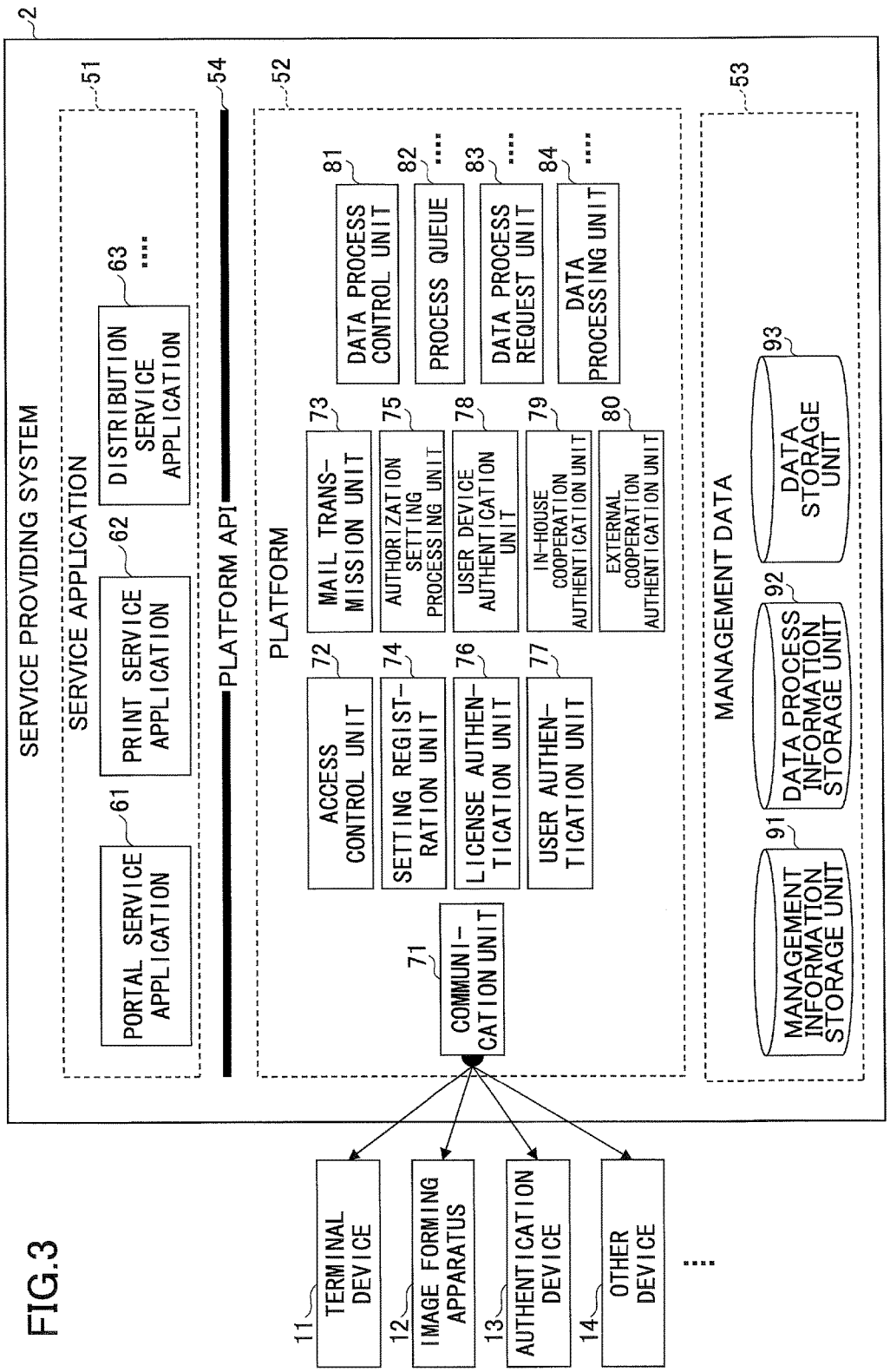
FIG. 3 is a process block diagram of an example of a service providing system according to an embodiment.

FIG. 3 is a process block diagram of an example of the service providing system according to the present embodiment. The service providing system 2 illustrated in FIG. 3 realizes, by executing programs, service applications 51, a platform 52, a management data storage unit 53, and a platform API (Application. Programming Interface) 54.

The service applications 51 illustrated in FIG. 3 include, for example, a portal service application 61, a print service application 62, and a distribution service application 63. The service application 51 is an application having a function of providing various services.

For example, the portal service application 61 is implemented in the portal service providing device 24 of FIG. 1. The print service application 62 is implemented in the print service providing device 22. The distribution service application 63 is implemented in the distribution service providing device 23.

The portal service application 61 is an application for providing a portal site for the user to use various services such as a print service and a distribution service. The portal service application 61 performs, in cooperation with the platform 52, processes for the user to use various services, such as a tenant registration process, a service registration process, and a process for registering various kinds of management information, described below.

The print service application 62 is an application for providing a print service that realizes printing by the image forming apparatus 12, for example, by storing print data and sending the print data to the image forming apparatus 12.

The distribution service application 63 is an application for providing a distribution service of performing a data process on image data sent from various devices such as the image forming apparatus 12, and distributing the processed data to the online storage 32 of FIG. 1, etc.

Note that the service applications 51 are not limited to the examples of FIG. 3; the service application 51 may include an application for providing a service of sending stored image data (projection data) to the other device 14 such as a projector. Furthermore, the service application 51 may include an application for providing a service of sending stored image data (projection data) to the other device 14 such as an electronic blackboard device. As described above, the service applications 51 include applications for providing some kind of service to each device such as the image forming apparatus 12 used by the user.

The platform API 54 is an interface for the service application 51 to use the platform 52. The platform API 54 is an interface defined in advance, which is provided for the platform 52 to receive a request from the service application 51, and is constituted by, for example, functions and classes. Note that when the service providing system 2 is constituted by being distributed across a plurality of information processing apparatuses, for example, a web API that can be used via the network, may be used as the platform API 54.

The platform 52 includes a communication unit 71, an access control unit 72, a mail transmission unit 73, a setting registration unit 74, an authorization setting processing unit 75, a license authentication unit 76, a user authentication unit 77, a user device authentication unit 78, an in-house cooperation authentication unit 79, an external cooperation authentication unit 80, a data process control unit 81, one or more process queues 82, one or more data process request units 83, and one or more data processing units 84.

The communication unit 71 is a function unit for executing communication with various devices such as the image forming apparatus 12, and is implemented in the access control device 21 of FIG. 1, for example. The access control unit 72 is a function unit for executing access control according to various accesses requested to the service providing system 2 from various devices such as the image forming apparatus 12, and is implemented in the access control device 21, for example.

The mail transmission unit 73 is a function unit for transmitting mails, and is implemented in the authentication device 26 of FIG. 1, for example. The setting registration unit 74 is a function unit for setting and registering various kinds of management data to be stored in the management data storage unit 53, and is implemented in the authentication device 26, for example. The authorization setting processing unit 75 is a function unit for executing a process for setting authorization for an external service such as the online storage 32, and is implemented in the authentication device 26, for example.

The license authentication unit 76 is a function unit for executing authentication relevant to licenses, based on license information and tenant information stored in the management data storage unit 53 as described below, and is implemented in the authentication device 26, for example. The user authentication unit 77 is a function unit for executing user authentication based on a login request from a device that does not require device authentication such as the terminal device 11, and is implemented in the authentication device 26, for example. The user device authentication unit 78 is a function unit for executing user authentication based on a login request from a device that requires device authentication such as the image forming apparatus 12, and is implemented in the authentication device 26, for example.

The in-house cooperation authentication unit 79 is a function unit for executing user authentication when the user performs authentication according to the authentication device 13 of FIG. 1 in a device such as the image forming apparatus 12, and the user attempts to log in with the use of a user ID acquired from the authentication device 13, and the in-house cooperation authentication unit 79 is implemented in the authentication device 26, for example. The external cooperation authentication unit 80 is a function unit for executing an authentication process for logging into the online storage 32 of FIG. 1, and is implemented in the authentication device 26, for example.

The data process control unit 81 is a function unit for controlling a data process executed based on a request from the service application 51, and is implemented in the data process control device 27, for example. The one or more process queues 82 are message queues corresponding to the types of data processes, and a message of a request relevant to a data process is registered in the process queue 82 from the data process control unit 81. The process queues 82 are implemented in the data process control device 27, for example.

Each of the one or more data process request units 83 monitors the process queue 82 assigned to itself, and receives a message of a request relevant to a data process from the process queue 82. The data process request unit 83 is a function unit for requesting the data processing unit 84 to execute a data process corresponding to the received message, and is implemented in the data process execution control device 28, for example.

The one or more data processing units 84 are function units for executing a data process according to a request from the data process request unit 83, and are implemented in the data processing device 29, for example. Note that examples of a data process executed by the data processing unit 84 are a division process of dividing a request from the service application 51, a data format conversion process of converting the data format, an OCR process for executing OCR, etc., requested from the service applications 51. Furthermore, an example of a data process executed by the data processing unit 84 is an upload process of uploading data in the online storage 32, etc.

Note that depending on the type of data process, the data process request unit 83 and the data processing unit 84 may be implemented in the data process execution control device 28, for example.

The management data storage unit 53 includes, for example, a management information storage unit 91, a data process information storage unit 92, and a data storage unit 93.

The management information storage unit 91 stores management information such as license information, tenant information, user information, device information, etc. The management information storage unit 91 is implemented in the authentication device 26, for example. The data process information storage unit 92 stores information relevant to a requested data process. The data process information storage unit 92 is implemented in the data process control device 27, for example. The data storage unit 93 stores other data such as application data and print data. The data storage unit 93 is implemented in the data process control device 27, for example.

For example, the management data stored in the management data storage unit 53 of FIG. 3 is as follows. FIG. 4 illustrates a configuration of an example of license information. The license information includes a license type, an ID, a registration code, and a registration state, as data items. The license type is information expressing the type of license. The types of licenses include a tenant, a print service, a distribution service, etc. The ID is the ID of each license, and is information used for license authentication. The registration code is information used when registering a tenant. The registration state is information indicating whether the registration of the license (registration of the ID) by the user is completed or not (registered or not registered).

FIG. 5 illustrates a configuration of an example of tenant information. The tenant information includes a tenant ID, a name, a service ID, a service type, a validity period, an external service, address information, usage district information, time zone information, etc., as data items. The tenant ID is an ID of a "tenant", which is a license type in the license information, and the tenant ID is information that is registered when the user performs tenant registration.

The name is a name set by the user when performing tenant registration, and a company name or an organization name is set, for example. The service ID is an ID of a service such as "print service" and "distribution service", which are license types in the license information, and the service ID is information that is registered when the user performs service registration after performing tenant registration.

The service type is information expressing the license type (type of service) corresponding to a service ID. The validity period is the validity period of the service ID. The validity period of a service ID registered in a particular device is managed from the time point of registration.

The external service is information expressing an external service that is used in cooperation with the service providing system 2. An example of an external service is the online storage 32 of FIG. 1. The address information is a mail address of an administrator that is registered at the time of tenant registration. The usage district information is information relevant to the country/area where the service is used. The time zone information is information expressing the time zone of the country/area where the service is used. Note that the online storage 32 is an example of an external service. Information of an account, a password, an authorization token, a scope, etc., described below is an example of information used when using an external service.

Note that authorization is for setting the usage range (authority) in using a service when the user uses the service, such as which service is to be used, the resource to which access is to be allowed, etc. The authorization may be set, for example, by using a standard technology of API authorization referred to as OAuth. From the viewpoint of using an external service such as the online storage 32 from the service providing system 2, the external service plays the role of the service provider of OAuth, and the service providing system 2 plays the role of the consumer of OAuth.

FIG. 6 illustrates a configuration of an example of user information. The user information includes a tenant ID; a user ID and password for login; a user ID for in-house authentication; an account, a password, an authorization token, a scope etc., for online storage; and address information, as examples of data items.

The user information is for managing information of users in units of tenant IDs. The user ID and password for login are authentication information used for user authentication when logging into the service providing system 2. The user ID for login may be a user name, etc., and may be any information for identifying the user when logging into the service providing system 2. The user ID for in-house authentication is user identification information for identifying a user in the authentication device 13 in the network N1 in an office, and the user ID for in-house authentication is authentication information used for user authentication when logging in with the use of the user identification information acquired from the authentication device 13. The user ID for in-house authentication may be any user identification information for identifying a user in the authentication device 13 in the network N1 in an office, and may be a card ID of an IC card or a terminal ID of a mobile terminal, etc., carried by the user.

The account and the password for online storage are authentication information used when logging into the online storage 32. The authorization token is information for using the online storage 32 within a range of a particular authority. The scope is information for identifying the usage range set according to the authorization.

Note that the account may be a user ID, a user name, an address for online storage, etc., and may be any authentication information used for authentication when the user logs into the target online storage 32. The address information is the mail address of the user.

FIG. 7 illustrates a configuration of an example of device information. The device information includes a tenant ID, a device ID, a service ID, a service type, a usage start date, a usage end date, etc., as data items. The device information is for managing the information of the devices in units of tenant IDs.

The device ID is information for identifying a device, and is information used for device authentication. An example of the device ID is the machine number of the device. The service ID and the service type are the same information as the service ID and the service type in the tenant information, and the service ID and the service type are registered when the user registers a service ID with respect to a particular device.

The usage start date is information of the date on which the service ID has been registered. The usage end date is information of the date on which the validity period of the registered service ID ends. A device registered in the device information can use the service corresponding to the registered service ID, from the usage start date to the usage end date of the service ID.

Note that there may be a type of service or a type of license whose validity period is indefinite (practically no restriction in the period). Furthermore, as for a device that is not registered in the device information, it is assumed that such a device can use some of the functions provided by the service providing system 2, except for services (functions) that cannot be used unless device authentication is performed.

Note that in the present embodiment, the terminal device 11 is indicated as an example of a device that does not require registration of device information. Furthermore, in the present embodiment, the image forming apparatus 12 is indicated as an example of a device that requires registration of device information.

Examples of functions that can be used at the terminal device 11 are setting and registering management data, inputting and deleting print data, etc. Furthermore, examples of functions that can be used at the image forming apparatus 12 are acquiring print data, sending distribution data, etc.

Note that the provider that is providing the service may determine which function requires device authentication for using the function, and which function does not require device authentication for using the function, and there may be a service that does not require device authentication.

FIG. 8 illustrates a configuration of an example of external service information. The external service information includes an external service ID, a service name, a client ID, a client secret, a product name, a scope, an authorization destination URL, a redirect destination URL, etc., as data items. The external service ID is information for specifying (identifying) an external service.

The service name is the name of an external service. The client ID is information for identifying the service providing system 2 issued by an external service. The client secret is secret information for assuring the identification of the client ID, and is information playing the role like a password. The product name is information for identifying the service application 51. The scope is information for identifying the usage range of an external service. The authorization destination URL is a URL of an authorization system provided in the external service (for example, a URL of an authorization server provided in the external service). The redirect destination URL is a URL of the service providing system 2 to which information is redirected from an external service (for example, a URL of a function as an authorization client of the authorization setting processing unit 75).

As seen in the above description, a tenant ID is associated with a service provided by the service providing system 2, a user using the service, and the device by which the service is used, and the tenant ID is information for managing a user, a device and a service in the service providing system 2. Furthermore, the tenant ID is information (usage target identification information) for identifying the usage target, such as which service, among the services that can be provided by the service providing system 2, is to be provided to which user, and to which device.

<Details of Process>

In the following a description is given of details of the process by the information processing system 1 according to the present embodiment.

<<Process from Tenant Registration to Service Registration>>

Figure 9:
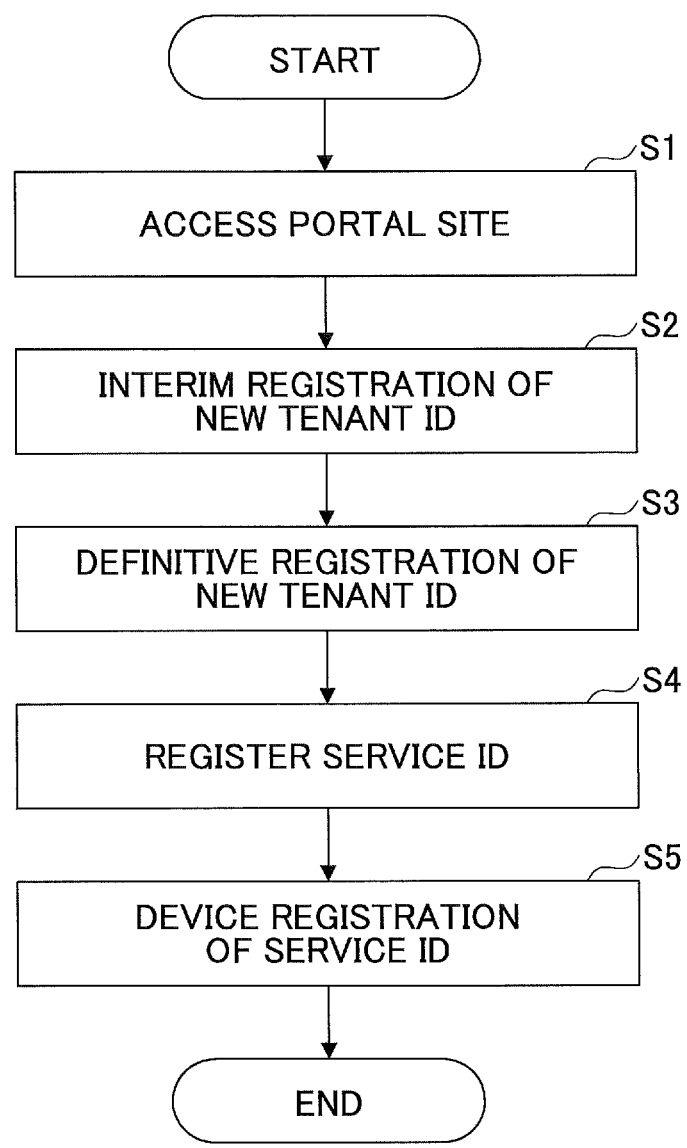
FIG. 9 is a flowchart of an example expressing the processing procedures from tenant registration to service registration.

FIG. 9 is a flowchart of an example expressing the processing procedures from tenant registration to service registration. First, the user who wants to perform tenant registration (for example, an administrator in a company or an organization) acquires a tenant ID and a registration code from the service provider (for example, the person in charge of providing and selling the service) of the service providing system 2. The tenant ID and the registration code acquired by the user are managed in, for example, the sales management device 30.

Note that examples of the method of acquiring the tenant ID and the registration code are a method of directly acquiring the tenant ID and the registration code from the service provider, a method of accessing an exclusive-use site operated by the service provider from the user's terminal device 11 and acquiring the tenant ID and the registration code, etc.

In step S1, the user operates the input device 501 of the terminal device 11, such that the terminal device 11 accesses a portal site of the service providing system 2. The terminal device 11 accesses the portal site of the service providing system 2, based on the operation by the user.

Because an access is made to the portal site, the access control unit 72 of the service providing system 2 authorizes access from the terminal device 11, and causes the terminal device 11 to access the portal service application 61.

The portal service application 61 displays a top screen on the display device 502 of the terminal device 11. The user can operate the input device 501 of the terminal device 11 to select, in the top screen, whether to request login or to request registration of a new tenant. Here, the description is continued assuming that the user has selected to request registration of a new tenant. Note that a user who is registered in the user information in the management information storage unit 91 (an administrator or another user) can select to request login by inputting a tenant ID, a user ID, and a password.

When a request to register a new tenant is made, in step S2, the portal service application 61 of the service providing system 2 displays, on the display device 502 of the terminal device 11, an input screen for performing interim registration of the tenant ID. The user operates the input device 501 of the terminal device 11 to input information for performing interim registration of the tenant ID, and subsequently requests interim registration. Based on the operations by the user, the terminal device 11 requests the portal site of the service providing system 2 to perform interim registration.

Note that the information input for performing interim registration of the tenant ID includes, for example, information (usage district information) relevant to the country/area where the service is used, and information indicating to agree to the terms of service (clause) displayed according to the country/area where the service is used. The information input for performing interim registration of the tenant ID includes the tenant ID, the registration code, the mail address, information such as the used language, and time zone information of the country/area where the service is used.

Accordingly, the service providing system 2 holds the terms of service (clause) information according to the country/area where the service is used. The portal service application 61 of the service providing system 2 implements display control for displaying, on the display device 502 of the terminal device 11, the terms of service according to the usage district information input by the user for performing interim registration of the tenant ID, and prompts the user to select whether to agree with the terms of service.

When a request for interim registration is received from the terminal device 11 of the user, the portal service application 61 requests the license authentication unit 76 to perform a process of confirming the validity of the tenant ID and the registration code included in the information input for performing interim registration of the tenant ID. The license authentication unit 76 that has received the request executes a license authentication process, and determines (checks) whether the tenant ID and the registration code for which a process of confirming the validity is requested, are stored in the license information of FIG. 4 stored in the management information storage unit 91.

When the tenant ID and the registration code for which a process of confirming the validity is requested, are stored in the license information, the license authentication unit 76 determines whether the registration state associated with the tenant ID and the registration code is "not registered".

When the registration state is "not registered", the license authentication unit 76 determines that the tenant ID and the registration code for which a process of confirming the validity is requested, are valid information, and authenticates the tenant ID (license). The license authentication unit 76 reports the authentication result of the license to the portal service application 61.

When the tenant ID and the registration code are valid information, the portal service application 61 requests the setting registration unit 74 to register the tenant ID, the mail address, the usage district information, and the time zone information, which are included in the information input for performing interim registration of the tenant ID. The setting registration unit 74 registers the tenant ID, the mail address, the usage district information, and the time zone information, in the tenant information in the management information storage unit 91, in response to the request from the portal service application 61.

When the registration is performed by the setting registration unit 74, in step S3, the portal service application 61 generates a URL for definitive registration, which is an access destination for displaying a screen for definitive registration, and creates a mail in which the URL for definitive registration is described. The portal service application 61 requests the mail transmission unit 73 to send the created mail. Then, the mail transmission unit 73 sends the mail addressed to a mail address included in the information input for performing interim registration of the tenant ID.

When the mail is sent by the mail transmission unit 73, the portal service application 61 displays a report screen reporting that the mail has been sent, on the display device 502 of the terminal device 11. Note that the URL for definitive registration is managed by, for example, a validity period from when the URL is generated (for example, one hour). Furthermore, from the viewpoint of enhancing security, it is assumed that the mail sent from the mail transmission unit 73 does not describe at least one of the tenant ID and the registration code.

Next, the user operates the input device 501 of the terminal device 11 to access the URL for definitive registration described in the received mail. Based on the operations by the user, the terminal device 11 accesses the URL for definitive registration. Note that the terminal device 11 to access the URL for definitive registration does not have to be the same as the terminal device 11 that has made the request for interim registration. The access control unit 72 causes the terminal device 11 to access the portal service application 61.

The portal service application 61 confirms whether access to the URL for definitive registration is valid (whether the access is to the generated URL for definitive registration, and the access is within the validity period). When the access is valid, the portal service application 61 displays a definitive registration screen on the display device 502 of the terminal device 11.

The user operates the input device 501 of the terminal device 11 to input information for performing definitive registration of the tenant ID in the definitive registration screen, and subsequently requests definitive registration. Note that the information input to the definitive registration screen includes tenant information such as a tenant ID, a name, and a registration code; a user ID and password for login; and user information such as address information. Note that either one of the tenant ID or the registration code, which the user has already input at the time of interim registration of the tenant ID, may be displayed in a state as it has been input in advance. However, from the viewpoint of enhancing security, as described above, it is assumed that the mail describing the URL for definitive registration does not describe at least the one that is to be input by the user, between the tenant ID and the registration code.

When definitive registration is requested from the terminal device 11 of the user, the portal service application 61 requests the license authentication unit 76 perform a process of validating the license (definitive registration process) based on the tenant ID and registration code input in the definitive registration screen.

The license authentication unit 76 that has received the request executes a license authentication process, and determines whether the tenant ID and registration code input in the definitive registration screen are stored in the license information stored in the management information storage unit 91. The license authentication unit 76 determines that the input tenant ID and registration code are valid information, when the input tenant ID and registration code are stored in the license information, and the registration state associated with the tenant ID and registration code is "not registered".

When the license authentication unit 76 determines that the input tenant ID and registration code are valid information, the license authentication unit 76 requests the setting registration unit 74 to change the state of the license information. The setting registration unit 74 changes the value of the registration state associated with the valid tenant ID and registration code, to "registered", in the license information stored in the management information storage unit 91.

When the process of validating the license is completed, the portal service application 61 requests the setting registration unit 74 to register the tenant information and the user information that the user input in the definitive registration screen in the terminal device 11. The setting registration unit 74 registers, in the tenant information stored in the management information storage unit 91, the name input as part of the tenant information in the definitive registration screen. Furthermore, the setting registration unit 74 registers, in the user information stored in the management information storage unit 91, the tenant ID, the user ID and password for login, the address information, etc.

When the registration of settings of various information items is completed by the setting registration unit 74, the portal service application 61 displays, on display device 502 of the terminal device 11, a tenant registration completion screen. Furthermore, the portal service application 61 creates a mail describing a tenant registration completion report, and requests the mail transmission unit 73 to send the mail. The mail transmission unit 73 sends the mail describing the tenant registration completion report to the mail address (address information registered in the tenant information) input in the terminal device 11 by the user for performing interim registration of the tenant ID.

For example, the user confirms the tenant registration completion screen displayed on the display device 502 of the terminal device 11. By completing the registration of the tenant ID, the user ID, and the password, the user is able to request login from the top screen of the portal site from the next time. By logging in from the top screen of the portal site, the user can perform the process of registering the tenant information, the user information, and the device information, which are associated with the tenant ID.

Note that when registering the user's tenant ID, user ID, and password, an account for a customer engineer (hereinafter, "CE account") may be generated. The CE account is an account used for authentication, when the customer engineer performs an operation such as validating a license and registering a service, in the office environment.

The CE account may be randomly generated or may be generated in a fixed manner by a value determined in advance. Furthermore, the CE account may differ according to the tenant, or may be common to all tenants. When the CE account is common to all tenants, the customer engineer can enjoy the convenience of performing operations for a plurality of tenants with a single user ID and a single password.

In step S4, the user such as the administrator operates the input device 501 of the terminal device 11 to input the tenant ID, the user ID, and the password in the top screen of the portal site, and subsequently requests to log in.

The portal service application 61, which has received the login request, requests the user authentication unit 77 to perform user authentication. The user authentication unit 77 determines (checks) whether the combination of the tenant ID, the user ID, and the password received from the terminal device 11, is stored in the user information stored in the management information storage unit 91.

When the combination of the tenant ID, the user ID, and the password received from the terminal device 11 is stored, the user authentication unit 77 authenticates the user who has made the login request. When the user is authenticated by the user authentication unit 77, the portal service application 61 authorizes the login.

The user who has logged into the portal service application 61 is able to register the service ID of the service that the use wants to use. The portal service application 61 displays, on the display device 502 of the terminal device 11, a service registration screen for registering a service ID. The user operates the input device 501 of the terminal device 11 to input the service ID in the service registration screen displayed on the display device 502 of the terminal device 11, and subsequently requests service registration. Based on the operations by the user, the terminal device 11 requests the portal service application 61 to perform service registration.

When service registration is requested from the terminal device 11, the portal service application 61 refers to the license information stored in the management information storage unit 91, and selects the ID that matches the service ID input by the user in the service registration screen. The portal service application 61 acquires the license type (service type) associated with the selected ID.

Furthermore, the portal service application 61 refers to the tenant information stored in the management information storage unit 91, and acquires usage district information associated with the tenant ID of the user who has logged in. The portal service application 61 displays, on the display device 502 of the terminal device 11, the terms of service according to the acquired license type and usage district information, and prompts the user to select whether to agree with the terms of service.

Thus, the service providing system 2 stores terms of service (clause) information according to the country/area where the service is used for each service type (license type). The portal service application 61 can implement display control for displaying the usage district information input by the user for performing interim registration of the tenant ID and the terms of usage according to the service type for which the service registration is requested, and prompt the user to select whether to agree with the terms of usage.

When the user operates the terminal device 11 to input a selection of agreeing with the terms of usage, the portal service application 61 requests the license authentication unit 76 to perform a service registration process based on the tenant ID of the user who has logged in and the service ID input in the service registration screen.

The license authentication unit 76 confirms (checks) whether service ID input in the service registration screen is stored as an ID in the license information stored in the management information storage unit 91. When the service ID input in the service registration screen is stored as an ID, the license authentication unit 76 determines that the service ID is a valid service ID (authenticates the service ID). When the service ID is determined to be valid, the license authentication unit 76 requests the setting registration unit 74 to register the service ID. The setting registration unit 74 registers, in the tenant information stored in the management information storage unit 91, the service ID and the service type in association with the tenant ID of the user who has logged in.

In step S5, the user such as the administrator performs device registration of the service ID. The user operates the input device 501 of the terminal device 11 to display a device registration screen on the display device 502 of the terminal device 11. The user operates the input device 501 of the terminal device 11 to input, in the device registration screen, a service ID and a device ID of the device in which the service can be used by the input service ID, and requests device registration of the service ID.

When device registration of the service ID is requested from the terminal device 11, the portal service application 61 requests the license authentication unit 76 to perform a process of performing device registration of the service ID, based on the tenant ID of the user who has logged in and the service ID and the device ID that have been input in the device registration screen.

The license authentication unit 76 determines (checks) whether the combination of the tenant ID of the user who has logged in and the service ID input in the device registration screen, is stored in the tenant information stored in the management information storage unit 91.

When the combination of the tenant ID of the user who has logged in and the service ID input in the device registration screen is stored, the license authentication unit 76 refers to the license information stored in the management information storage unit 91. The license authentication unit 76 determines whether the registration state associated with the service ID input in the device registration screen is "not registered".

When the registration state is "not registered, the license authentication unit 76 requests the setting registration unit 74 to perform device registration of the service ID, Note that the service ID whose registration state is "not registered", is a service ID for which the device registration of the service ID has not been performed. The setting registration unit 74 registers, in the device information stored in the management information storage unit 91, the tenant ID of the user who has logged in and the service ID and the device ID input in the device registration screen. Furthermore, the setting registration unit 74 refers to the tenant information stored in the management information storage unit 91, and acquires the service type and validity period identified by the tenant ID and the service ID. The setting registration unit 74 registers, in the device information stored in the management information storage unit 91, the service type, the usage start date, and the usage end date, based on the acquired service type and validity period.

As the usage start date, the date on which the device registration of the service ID is performed, is stored. As the usage end date, a last date, which is calculated based on the validity period (for example, one year) acquired from the tenant information and the usage start date, is stored. However, the usage start date may be specified in the request for service registration in step S4, for example. When the usage start date can be specified, the usage start date specified in the request for service registration, is stored as the usage start date in the device information. Then, when the device registration of the service ID is completed, the setting registration unit 74 changes the value of the registration state associated with the service ID for which the device registration has been performed, to "registered", in the license information stored in the management information storage unit 91.

As described above, by the processes from tenant registration to service registration, the user such as the administrator can perform tenant registration, service ID registration, and device registration of the service ID, by accessing the service providing system 2 from the terminal device 11. Therefore, the user can easily perform the procedures required for receiving the provision of a service. Furthermore, the service providing system 2 can manage the service to be provided, the user using the service, and the device by which the service can be used, in units of tenant IDs of which the license has undergone the validation process.

<<User Authentication/Device Authentication Function Provided in Service Providing System>>

Figure 10:
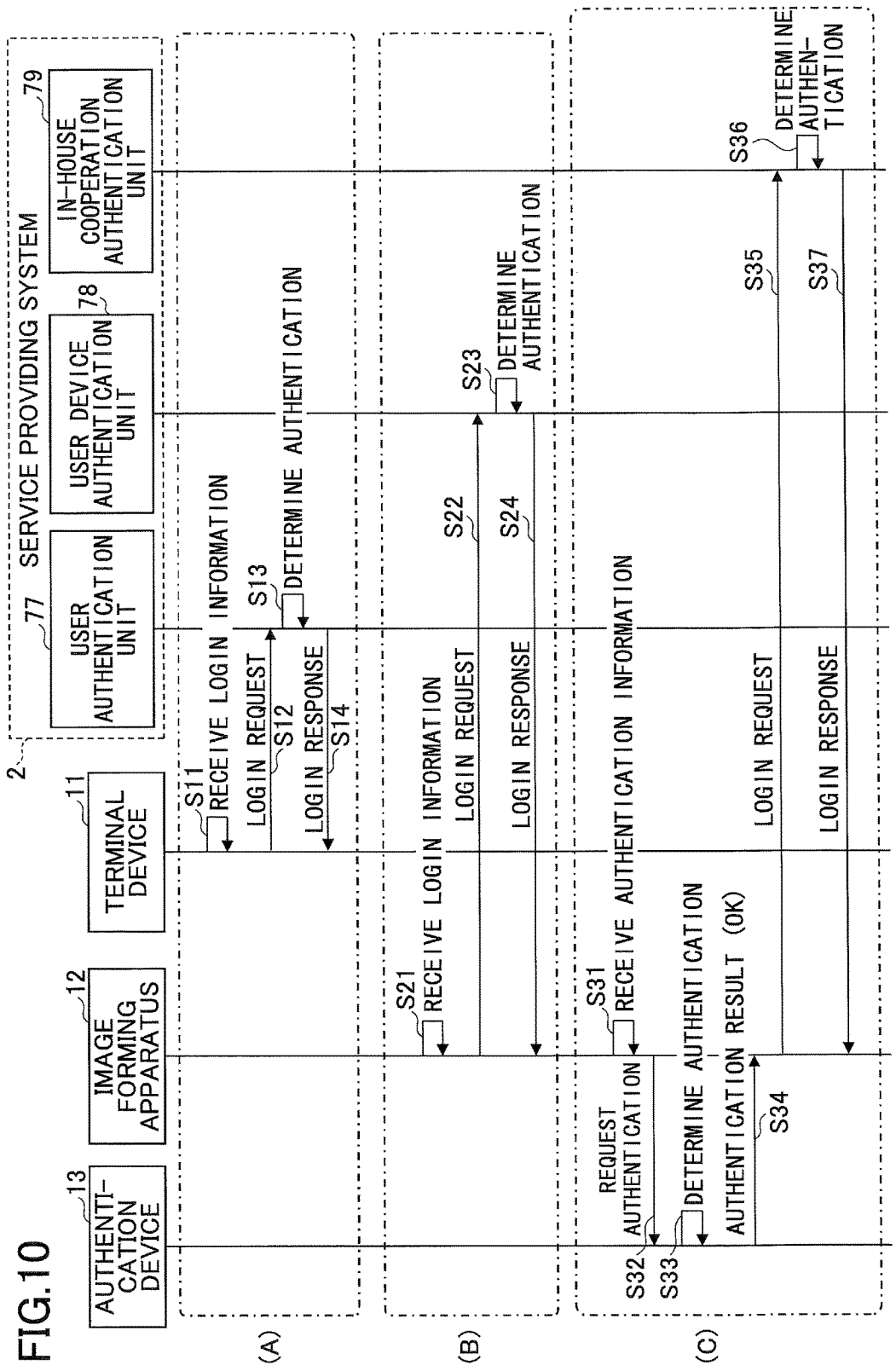
FIG. 10 is a sequence diagram of an example of a user authentication/device authentication process.

FIG. 10 is a sequence diagram of an example of a user authentication/device authentication process. FIG. 10 (A) illustrates user authentication from the terminal device 11 that does not require device authentication. FIG. 10 (B) illustrates user device authentication from the image forming apparatus 12 that requires device authentication. FIG. 10 (C) illustrates in-house cooperation authentication from the image forming apparatus 12 that requires device authentication.

As illustrated in FIG. 10 (A), in user authentication from the terminal device 11, the user inputs, in the top screen of the portal site, a tenant ID, a user ID, and a password, as login information. In step S11, the terminal device 11 receives the login information input by the user.

In step S12, the terminal device 11 makes a login request to the service providing system 2, by using the login information input by the user. The access control unit 72 of the service providing system 2 requests the user authentication unit 77 to perform user authentication.

In step S13, the user authentication unit 77 confirms whether the user information stored in the management information storage unit 91 includes the login information received from the terminal device 11. When the user information stored in the management information storage unit 91 includes the login information received from the terminal device 11, the user authentication unit 77 determines that the user authentication is successful. When the login information received from the terminal device 11 is not included, the user authentication unit 77 determines that the user authentication is unsuccessful.

When the user authentication is successful, the access control unit 72 authorizes the login (login for using the service) into the service providing system 2 from the terminal device 11. In step S14, the access control unit 72 sends, to the terminal device 11, a login response based on the result of user authentication by the user authentication unit 77.

In FIG. 10 (B) and FIG. 10 (C), the image forming apparatus 12 stores a setting of whether to use a user ID and a password for login or to use a user ID for in-house authentication, when performing the user authentication for logging into the service providing system 2. Note that the setting of whether to use a user ID and a password for login or to use a user ID for in-house authentication, can be changed according to need. Furthermore, it is assumed that the image forming apparatus 12 stores a tenant ID and a device ID in a storage area in itself.

When the setting is to use a user ID and a password for login, the image forming apparatus 12 performs user device authentication as illustrated in FIG. 10 (B), in order to log into the service providing system 2.

In step S21, the image forming apparatus 12 displays an input screen for the user to input a user ID and a password for login. The user inputs a user ID and a password for login, in the input screen displayed on the image forming apparatus 12. The image forming apparatus 12 receives the user ID and the password for login input by the user.

In step S22, the image forming apparatus 12 sends, to the service providing system 2 as login information, the user ID and the password for login input by the user and the tenant ID and the device ID stored in the storage area in itself, and makes a login request to the service providing system 2. The access control unit 72 of the service providing system 2 requests the user device authentication unit 78 to perform user device authentication.

In step S23, the user device authentication unit 78 confirms whether the combination of the tenant ID and the device ID included in the login information received from the image forming apparatus 12, is included in the device information stored in the management information storage unit 91. When the combination of the tenant ID and the device ID is included, the user device authentication unit 78 determines that the device authentication is successful. When the combination of the tenant ID and the device ID is not included, the user device authentication unit 78 determines that the device authentication is unsuccessful.

Furthermore, the user device authentication unit 78 confirms whether the combination of the tenant ID, and the user ID and the password for login included in the login information received from the image forming apparatus 12, is included in the user information stored in the management information storage unit 91. When the combination of the tenant ID, and the user ID and the password for login included in the login information received from the image forming apparatus 12, is included in the user information stored in the management information storage unit 91, the user device authentication unit 78 determines that the user authentication is successful. When the combination of the tenant ID, and the user ID and the password for login included in the login information received from the image forming apparatus 12 is not included, the user device authentication unit 78 determines that the user authentication is unsuccessful.

When the device authentication and the user authentication are successful, the access control unit 72 authorizes the login (login for using the service) to the service providing system 2 from the image forming apparatus 12. In step S24, the access control unit 72 sends, to the image forming apparatus 12, a login response based on the result of device authentication and user authentication by the user device authentication unit 78.

When the setting is to use a user ID for in-house authentication, the image forming apparatus 12 performs in-house cooperation authentication as illustrated in FIG. 10 (C), in order to log into the service providing system 2. First, the user executes user authentication in the image forming apparatus 12. The user authentication executed in the image forming apparatus 12 is executed for using the image forming apparatus 12, or for using a particular function of the image forming apparatus 12. Here, a description is given of an example in which the authentication device 13 performs user authentication by using a card ID stored in an IC card, etc., carried by the user.

In step S31, the user causes a card reader (not illustrated), which is connected to the image forming apparatus 12, to read a card ID and perform user authentication. In step S32, the image forming apparatus 12 sends the card ID read by the card reader to the authentication device 13 and requests authentication.

In step S33, the authentication device 13 performs authentication determination by using the card ID received from the image forming apparatus 12. The authentication device 13 stores, in a storage area, user authentication information in which card IDs and user IDs are associated with each other. The authentication device 13 refers to the user authentication information in which card IDs and user IDs are associated with each other, and confirms whether it is possible to identify a user ID associated with the card ID received from the image forming apparatus 12.

When a user ID associated with the card ID is identified, the authentication device 13 determines that user authentication is successful. In step S34, the authentication device 13 sends, to the image forming apparatus 12, the identified user ID together with an authentication result indicating authentication successful.

Next, the user is able to request login to the service providing system 2, by selecting to log into the service providing system 2 in a display screen of the image forming apparatus 12, for example. In step S35, the user requests to log into the service providing system 2 from the image forming apparatus 12.

When a request to log into the service providing system 2 by the user is received, the image forming apparatus 12 sends, to the service providing system 2 as login information, the specified user ID and the tenant ID and the device ID stored in the storage area in itself, and makes a login request to the service providing system 2. The access control unit 72 of the service providing system 2 requests the in-house cooperation authentication unit 79 to perform in-house cooperation authentication.

In step S36, the in-house cooperation authentication unit 79 confirms whether the combination of the tenant ID and the device ID included in the login information received from the image forming apparatus 12, is included in the device information stored in the management information storage unit 91.

When the combination of the tenant ID and the device ID is included, the in-house cooperation authentication unit 79 determines that the device authentication is successful. When the combination of the tenant ID and the device ID is not included, the in-house cooperation authentication unit 79 determines that the device authentication is unsuccessful.

Furthermore, the in-house cooperation authentication unit 79 confirms whether the combination of the tenant ID and the user ID for in-house authentication included in the login information received from the image forming apparatus 12, is included in the user information stored in the management information storage unit 91. When the combination of the tenant ID and the user ID for in-house authentication included in the login information received from the image forming apparatus 12, is included in the user information stored in the management information storage unit 91, the in-house cooperation authentication unit 79 determines that the user authentication is successful.

When the combination of the tenant ID and the user ID for in-house authentication included in the login information received from the image forming apparatus 12, is not included, the in-house cooperation authentication unit 79 determines that the user authentication is unsuccessful.

When the device authentication and the user authentication are successful, the access control unit 72 authorizes the login (login for using the service) to the service providing system 2 from the image forming apparatus 12. In step S37, the access control unit 72 sends, to the image forming apparatus 12, a login response based on the result of device authentication and user authentication by the in-house cooperation authentication unit 79.

Note that when the device authentication is successful and the user authentication is unsuccessful by the in-house cooperation authentication unit 79, the service providing system 2 may cause the image forming apparatus 12 to display an input screen for having the user input a user ID and a password for login.

In this case, the user is able to input a user ID and a password for login in the input screen, and request login again. The image forming apparatus 12 sends, to the user device authentication unit 78 of the service providing system 2, the user ID and the password for login input by the user and the tenant ID stored in the storage area in itself, and makes a login request.

The user device authentication unit 78 confirms whether the combination of the tenant ID and the user ID and the password for login received from the image forming apparatus 12, is included in the user information stored in the management information storage unit 91.

When the combination of the tenant ID and the user ID and the password for login received from the image forming apparatus 12, is included in the user information stored in the management information storage unit 91, the user device authentication unit 78 determines that the user authentication is successful. The access control unit 72 authorizes login to the service providing system 2.

Furthermore, the setting registration unit 74 registers, in the user information stored in the management information storage unit 91, the user ID for in-house authentication received from the image forming apparatus 12, in association with the tenant ID and the user ID and the password for login received from the image forming apparatus 12. As described above, by registering, in the user information, the user ID for in-house authentication received from the image forming apparatus 12 in association with the tenant ID and the user ID and the password for login, the user is able to log in by using the user ID for in-house authentication from the next time.

<<Data Processing Functions Included in Service Providing System>>

In the service providing system 2, the data process control unit 81, the process queue 82, the data process request unit 83, and the data processing unit 84 in the platform 52 execute various data processes requested from a process request unit 101 of the service application 51 as follows.

Figure 11:
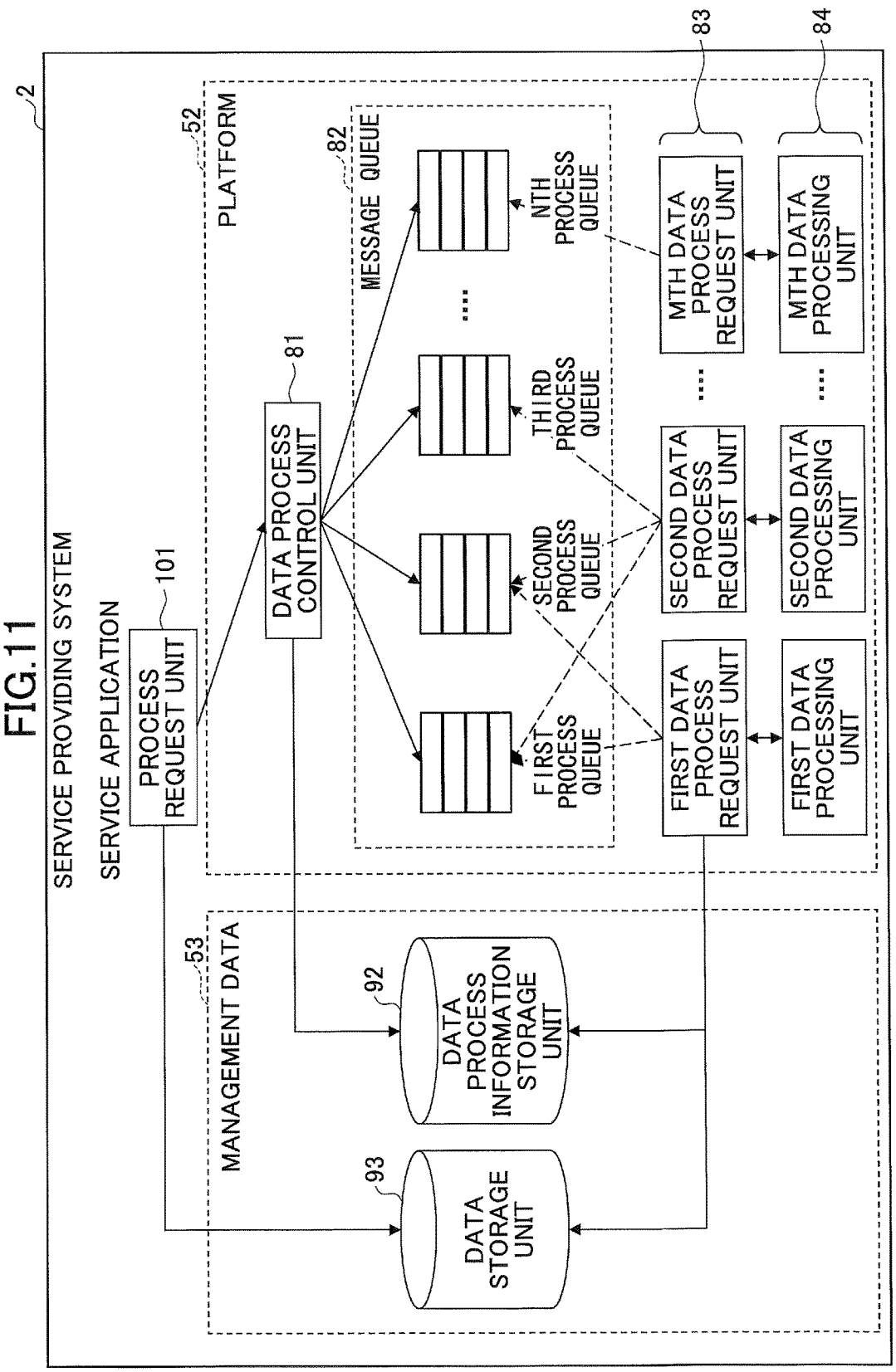
FIG. 11 illustrates examples of data processing functions included in the service providing system.

FIG. 11 illustrates examples of data processing functions included in the service providing system 2. The process request unit 101 of the service application 51 records the target data in the data storage unit 93 of the management data storage unit 53. The data that is the target of processing is process target data such as application data and image data.

Furthermore, the process request unit 101 sends a data process request (hereinafter, "request") to the data process control unit 81 of the platform 52. The request that is sent includes the process content of the data process and information (for example, a URI) indicating the recording destination of the process target data.

Here, the process request unit 101 of the service application 51 may include, in the request, a completion report indicating that the process has been completed and a report destination for receiving the report indicating the result of the process. This report destination is included in the request as, for example, a URL.

As described above, when a process relevant to a request made to the data process control unit 81 of the platform 52 is completed, the service application 51 is able to send the completion report to the report destination included in the request. The service application 51 that is the request source is able to quickly recognize the completion of processes performed in an asynchronous manner.

The data process control unit 81 analyzes the received request, and registers a message in the process queue (message queue) 82 according to the process content of the data process. Note that a process queue 82 is provided for each process content of a data process.

Furthermore, the data process control unit 81 registers the information of the request in the data process information storage unit 92 of the management data storage unit 53. The information of the request includes the recording destination of the process target data, the process content of the data process, the state of the request, etc.

States of the request include "received", "executing", "completed", etc. Note that the state of the request expresses the process status of the data process. The state of the request is "received" at the stage where the data process control unit 81 registers the information of the request.

Each data process request unit 83 monitors one or more process queues 82 assigned to itself. That is to say, each data process request unit 83 monitors requests of process contents of one or more data processes. Each data process request unit 83 acquires a message registered in the process queue 82 being monitored (by the corresponding data process request unit 83).

For example, in FIG. 11, a "first data process request unit" 83 monitors a "first process queue" 82 and a "second process queue" 82 having different data process contents. Furthermore, a "second data process request unit" 83 monitors a "first process queue" 82 through a "third process queue" 82 having different data process contents. In the example of FIG. 11, the "first data process request unit" 83 and the "second data process request unit" 83 monitor overlapping process queues, i.e., the "first process queue" 82 and the "second process queue" 82.

Note that the assignment of the process queues 82 to be monitored by each data process request unit 83 may be set and changed according to need. For example, the assignment of the process queues 82 to be monitored by each data process request unit 83 may be set and changed according to need, depending on the request frequency and the processing time of each process content of a data process.

The data process request unit 83 acquires information of the request from the data process information storage unit 92, based on the message acquired from the process queue 82 being monitored. The data process request unit 83 causes the data processing unit 84 to execute a data process of the request, based on the recording destination of the process target data and the process content of the data process included in the information of the acquired request.

Next, the data process request unit 83 updates the information of the request based on the execution result of the data process executed by the data processing unit 84, and registers the updated information of the request in the data process information storage unit 92. The updating of the information of the request may be a process of deleting the process content of an executed data process from the request, a process of making a change when there is a change the state of the request, etc. Furthermore, when the information of the request includes the process contents of the data process to be performed next, the data process request unit 83 registers a message in the process queue 82 corresponding to the process content of the data process.

Note that when the process target data before the data process changes to different data after the data process as a result of causing the data processing unit 84 to execute the data process of the request, the data process request unit 83 records the process target data after the process in the data storage unit 93. Furthermore, the data process request unit 83 updates the information of the request according to the information of the recording destination of the process target data after the process.

Figure 12:
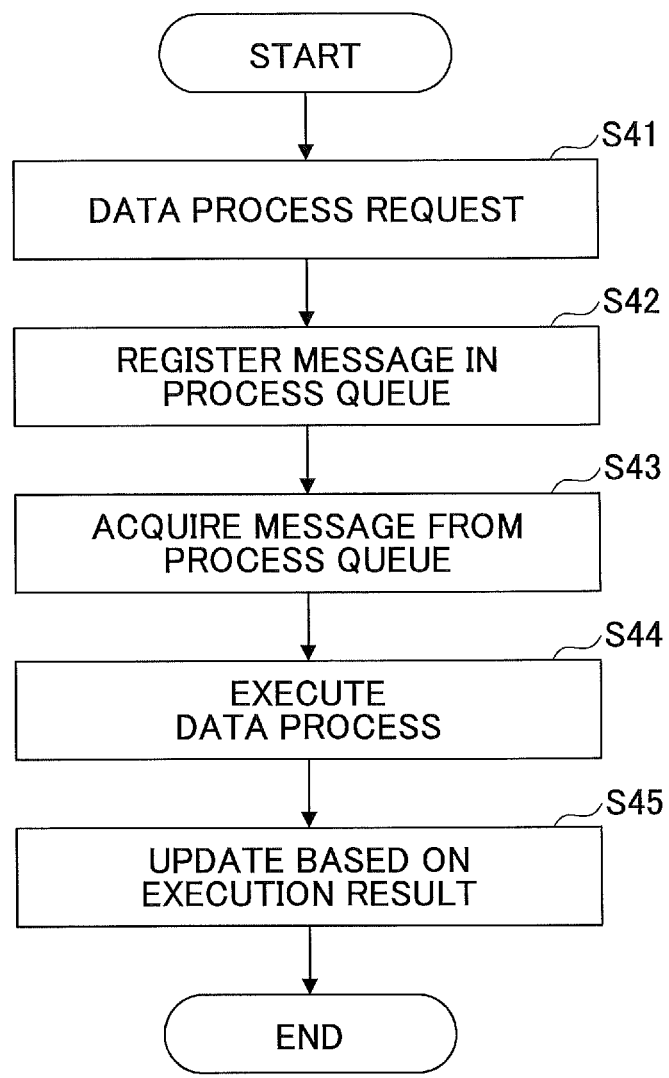
FIG. 12 is a flowchart of an example of processing procedures of the data process functions included in the service providing system.

FIG. 12 is a flowchart of an example of processing procedures of the data process functions included in the service providing system 2. In step S41, the process request unit 101 of the service application 51 records the process target data in the data storage unit 93 of the management data storage unit 53. Furthermore, the process request unit 101 sends a request (data process request) to the data process control unit 81 of the platform 52.

In step S42, the data process control unit 81 analyzes the request, and registers a message in the process queue 82 corresponding to the process content of the data process. Furthermore, the data process control unit 81 registers the information of the request in the data process information storage unit 92 of the management data storage unit 53.

In step S43, each data process request unit 83 acquires the message registered in the process queue 82 being monitored, from the process queue 82. In step S44, the data process request unit 83 acquires the information of the request from the data process information storage unit 92 based on the acquired message. Then, based on the acquired information of the request, the data process request unit 83 causes the data processing unit 84 to execute the data process of the request.

In step S45, the data process request unit 83 updates the information of the request based on the execution result of the data process executed by the data processing unit 84, registers the updated information of the request in the data process information storage unit 92, and subsequently ends the process of the flowchart of FIG. 12.

Note that when the information of the request includes the process content of the data process to be performed next, the data process request unit 83 registers a message in the process queue 82 corresponding to the process content of the data process, and subsequently ends the process of the flowchart of FIG. 12.

In the following, several specific examples of process contents of data processes are described; however, the process contents of data processes are not limited to the following specific examples. As a first specific example of a process content of a data process, there is a data process of converting the data format of the process target data.

For example, a data process of converting image data into PDF (Portable Document Format) data is an example of a data process of converting the data format of the process target data. In the data process of converting image data into PDF data, the process content of the data process is expressed as "image2pdf", etc.

Furthermore, a data process of converting PDF data into PDL (Page Description Language) data is also an example of a data process of converting the data format of the process target data. In the data process of converting PDF data into PDL data, the process content of the data process is expressed as "pdf2pdl", etc.

Furthermore, a data process of converting Office (registered trademark) document data of Microsoft (registered trademark) into PDL data is also an example of a data process of converting the data format of the process target data. In the data process of converting Office document data into PDL data, the process content of the data process is expressed as "office2pdl", etc.

As a second specific example of a process content of a data process, there is a data process of dividing the process content of one data process into process contents of a plurality of data processes, and converting the request into requests of the data processing units 84 according to the divided process contents of data processes.

For example, a data process of converting image data into PDL data may also be realized by dividing the data process into a data process of converting image data into PDF data and a data process of converting PDF data into PDL data. Note that in the data process of converting image data into PDL data, the process content of the data process is expressed as "image2pdl", etc.

For example, the data processing unit 84 executes a data process of dividing the request of the data process of "image2pdl" into requests of data processes of "image2pdf" and "pdf2pdl". As described above, among the data processing units 84, there is a data processing unit 84 that performs a data process of dividing a request of one data process into requests of a plurality of data processes.

As described above, for example, even when there is no data processing unit 84 that is capable of executing a data process of "image2pdl", it is possible to execute the desired data process of "image2pdl" by performing the data processes of "image2pdf" and "pdf2pdl" in cooperation with each other.

The service providing system 2 according to the present embodiment is able to perform a data process of dividing the data content of a single data process into process contents of a plurality of data processes, and is therefore capable of flexibly responding to an increase in the types of process contents of data processes.

Furthermore, as a third specific example of a process content of a data process, there is a data process of cooperating with an external storage. For example, one example of a data process of cooperating with an external storage, is a data process of requesting the external cooperation authentication unit 80 to log into the online storage 32 by using an account and a password for online storage corresponding to the user who has logged in.

A data process of storing data in the online storage 32 to which the user has logged in, and a data process of acquiring data from the online storage 32 to which the user has logged in, are also examples of a data process of cooperating with an external storage.

<<Cooperation with Online Storage>>

Figure 13:
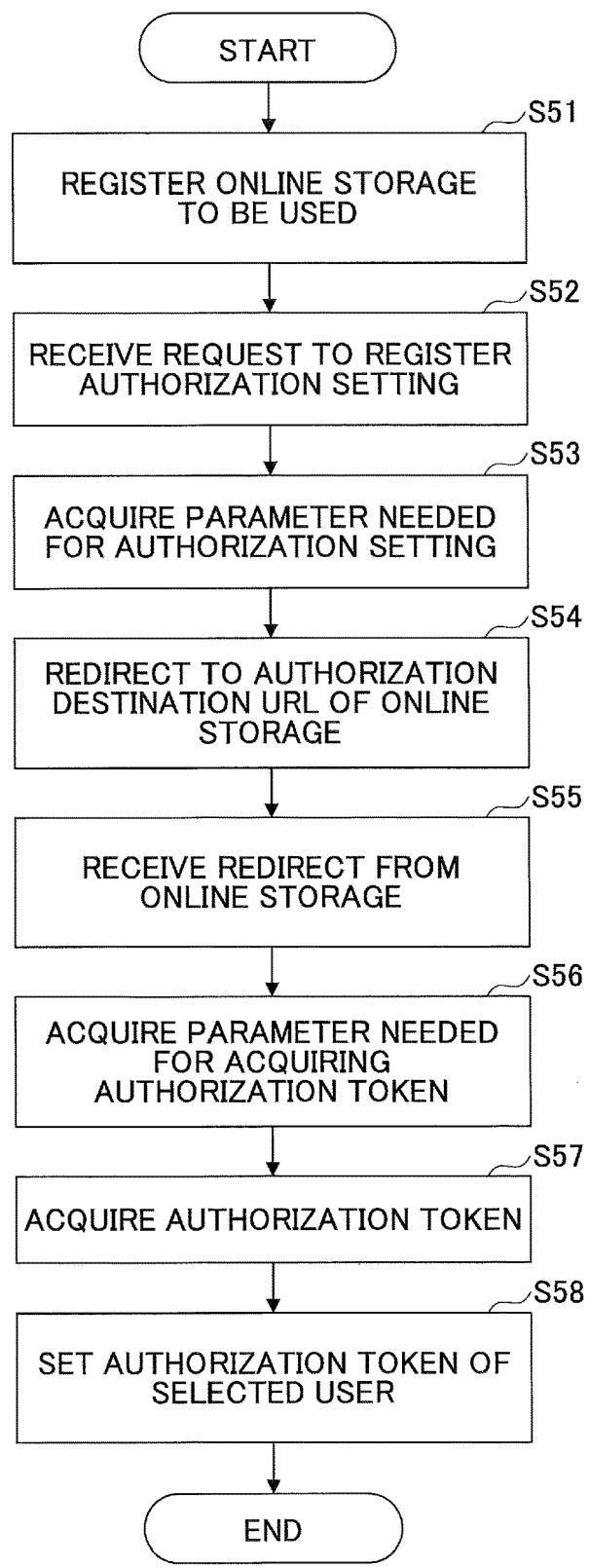
FIG. 13 is a flowchart of an example of an authorization setting with respect to an online storage.

FIG. 13 is a flowchart of an example of an authorization setting with respect to an online storage. The user such as the administrator operates the input device 501 of the terminal device 11, inputs a tenant ID, a user ID, and a password in the top screen of the portal site, and subsequently makes a login request. The portal service application 61, which has received the login request, authorizes the login, and subsequently displays a registration screen of an external service on the display device 502 of the terminal device 11.

In step S51, the user selects, in the registration screen of the external service, the online storage (external service) 32 that the user wants to use, from a list of external services stored in external service information in the management information storage unit 91, and the requests registration.

The portal service application 61, which has received the request for registration, requests the setting registration unit 74 to register the online storage 32 selected by the user. The setting registration unit 74 registers the online storage 32 selected by the user in the tenant information in the management information storage unit 91, in association with the tenant ID of the user who has logged in.

In step S52, the user selects, in an authorization setting screen of the portal site, a user ID of the user for which an authorization setting is to be applied, an external service ID performing the authorization setting, and the scope to be set for the user, and requests the registration of the authorization setting. The external service ID may be a service name of an external service. The portal service application 61 receives the request of the authorization setting.

In step S53, the portal service application 61, which has received the request for authorization setting, requests the authorization setting processing unit 75 to make the authorization setting. The authorization setting processing unit 75 acquires parameters necessary for authorization setting from the external service information in the management information storage unit 91. Note that parameters necessary for authorization setting include an external service ID, a scope, a client ID associated with the selected external service ID, a redirect destination URL, an arbitrary session key for maintaining a session, etc.

In step S54, the authorization setting processing unit 75, which has acquired the parameters necessary for authorization setting, acquires an authorization destination URL associated with the selected external service ID, from the external service information in the management information storage unit 91. The authorization setting processing unit 75 redirects the request including the parameters necessary for authorization setting (request in which the parameters necessary for authorization setting are the query of the GET request), from the terminal device 11 to the authorization destination URL.

By redirecting the request from the terminal device 11 to the authorization destination URL, an authorization setting is made between the terminal device 11 and the online storage 32. Note that after making the authorization setting, information is redirected from the online storage 32 to the authorization setting processing unit 75, and therefore the session at the HTTP level is interrupted. Therefore, a session key is used for maintaining the same session.

The redirected online storage 32 displays a login screen on the display device 502 of the terminal device 11. The user operates the input device 501 of the terminal device 11 to input an account and a password in the login screen, and subsequently makes a login request. The online storage 32, which has received the login request, accepts the login request.

When the login is successful, the online storage 32 displays, on the display device 502 of the terminal device 11, an authorization screen. The user confirms the authorization screen. When performing authorization, for example, the user operates the input device 501 of the terminal device 11, and presses an authorization button displayed in the authorization screen, to request authorization. The online storage 32, which has received the request for authorization, registers authorization.

In step S55, the online storage 32 redirects an authorization code indicating that authorization has been acknowledged and a session key, to the redirect URL from the terminal device 11. In step S56, the authorization setting processing unit 75 of the service providing system 2 receives the authorization code. Note that when the user has already logged in at the time of redirecting to the online storage 32, the displaying of the login screen is omitted.

In step S56, the authorization setting processing unit 75 that has received the authorization code acquires parameters necessary for acquiring an authorization token from external service information in the management information storage unit 91. The parameters necessary for acquiring an authorization token include the received authorization code, a client ID associated with the external service ID of the online storage 32 that has sent the authorization code, a client secret, etc.

In step S57, the authorization setting processing unit 75 sends, to the online storage 32, the acquired client ID and client secret, and the received authorization code, and requests to acquire an authorization token. The online storage 32 verifies the received authorization code, and sends the authorization token to the authorization setting processing unit 75 of the service providing system 2.

In step S58, the authorization setting processing unit 75, which has received the authorization token, requests the setting registration unit 74 to register the authorization token. The setting registration unit 74 registers, in the user information in the management information storage unit 91, the user for applying the authorization setting selected in the authorization setting screen, the received authorization token, and the scope, in association with each other. When the registration of the authorization token is completed, the authorization setting processing unit 75 reports the completion of the registration to the portal service application 61. The portal service application 61 displays a screen indicating the setting result of the authorization setting, on the display device 502 of the terminal device 11.

Note that when sending the authorization token to the service providing system 2, the online storage 32 may also send the validity period of the authorization token and a refresh token for reissuing an authorization token in case the validity period expires.

Figure 14:
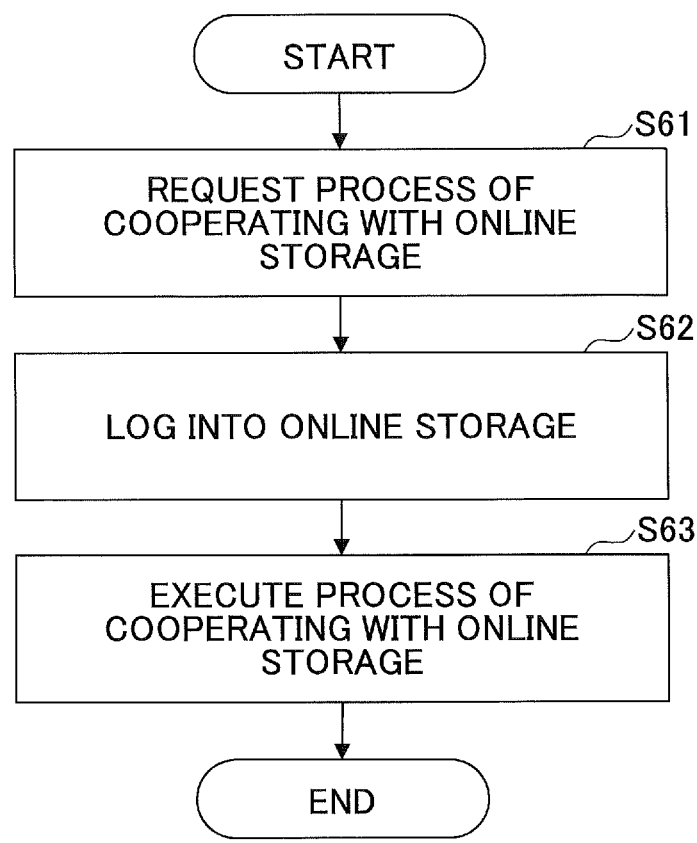
FIG. 14 is a flowchart of an example of a process for cooperating with an online storage.

FIG. 14 is a flowchart of an example of a process for cooperating with an online storage. In step S61, the user who has logged into the service providing system 2, makes a request for a process of cooperating with the online storage 32 by using the service providing system 2 from the terminal device 11, the image forming apparatus 12, etc.

When a process of cooperating with the online storage 32 is requested, in step S62, the external cooperation authentication unit 80 of the service providing system 2 performs a process of logging into the online storage 32.

The external cooperation authentication unit 80 receives a request to log into the online storage 32 from the data processing unit 84, for example. The external cooperation authentication unit 80 acquires, from the user information in the management information storage unit 91, information required for the login process relevant to the user who has logged into the service providing system 2 and the online storage 32 to which the login process is to be performed. Specifically, the external cooperation authentication unit 80 acquires information required for the login process of the online storage 32 associated with the tenant ID of the user who has logged into the service providing system 2, and the user ID and password for login.

For example, in the case of the user information of FIG. 6, when a login request to the "online storage A" is received, the external cooperation authentication unit 80 acquires an account and a password as information required for the login process to the "online storage A".

Furthermore, in the case of the user information of FIG. 6, when a login request to the "online storage B" is received, the external cooperation authentication unit 80 acquires an account and an authorization token as information required for the login process to the "online storage B".

When the cooperating online storage 32 does not have an authorization setting like the "online storage A", and the cooperating online storage 32 is an external service that performs a login process, the external cooperation authentication unit 80 requests login to the "online storage A" by using an account and a password. The account and the password are examples of authentication information with respect to an external service. The "online storage A", which has received the login request, executes authentication with respect to the received account and password. When the authentication is successful, the "online storage A" sends a response indicating to authorize login to the external cooperation authentication unit 80. When the authentication is unsuccessful, the "online storage A" sends a response indicating not to authorize login to the external cooperation authentication unit 80.

When the external cooperation authentication unit 80 receives a response indicating to authorize login from the "online storage A", the service providing system 2 is able to upload (store) data in the "online storage A". When the external cooperation authentication unit 80 receives a response indicating to authorize login from the "online storage A", the service providing system 2 is able to download (acquire) data from the "online storage A".

As described above, when the external cooperation authentication unit 80 receives a response indicating to authorize login from the online storage 32, in step S63, the service providing system 2 can execute a process of cooperating with the online storage 32.

When the cooperating online storage 32 is an external service that has an authorization setting like the "online storage B", the external cooperation authentication unit 80 requests login to the "online storage B" by using an account and an authorization token. The account and the authorization token are examples of authentication information with respect to an external service. The "online storage B", which has received the login request, confirms the validity of the received account and authorization token. When the validity is confirmed, the "online storage B" sends a response indicating to authorize login to the external cooperation authentication unit 80. When the authorization is unsuccessful, the "online storage B" sends a response indicating not to authorize login to the external cooperation authentication unit 80.

When the external cooperation authentication unit 80 receives a response indicating to authorize login from the "online storage B", in step S63, the service providing system 2 can realize a process of cooperating with the online storage 32 within the usage range set by the scope.

<<Download Process of Delete Log Information>>

In the information processing system 1 according to present embodiment, information relevant to the deletion of print data stored in the service providing system 2, is recorded as delete log information. The delete log information is information recording the history of deleting print data. The deleting of print data includes deleting the print data after printing has ended, manually deleting the print data by the user, and automatically deleting the print data when the storage period has passed.

Figure 15:
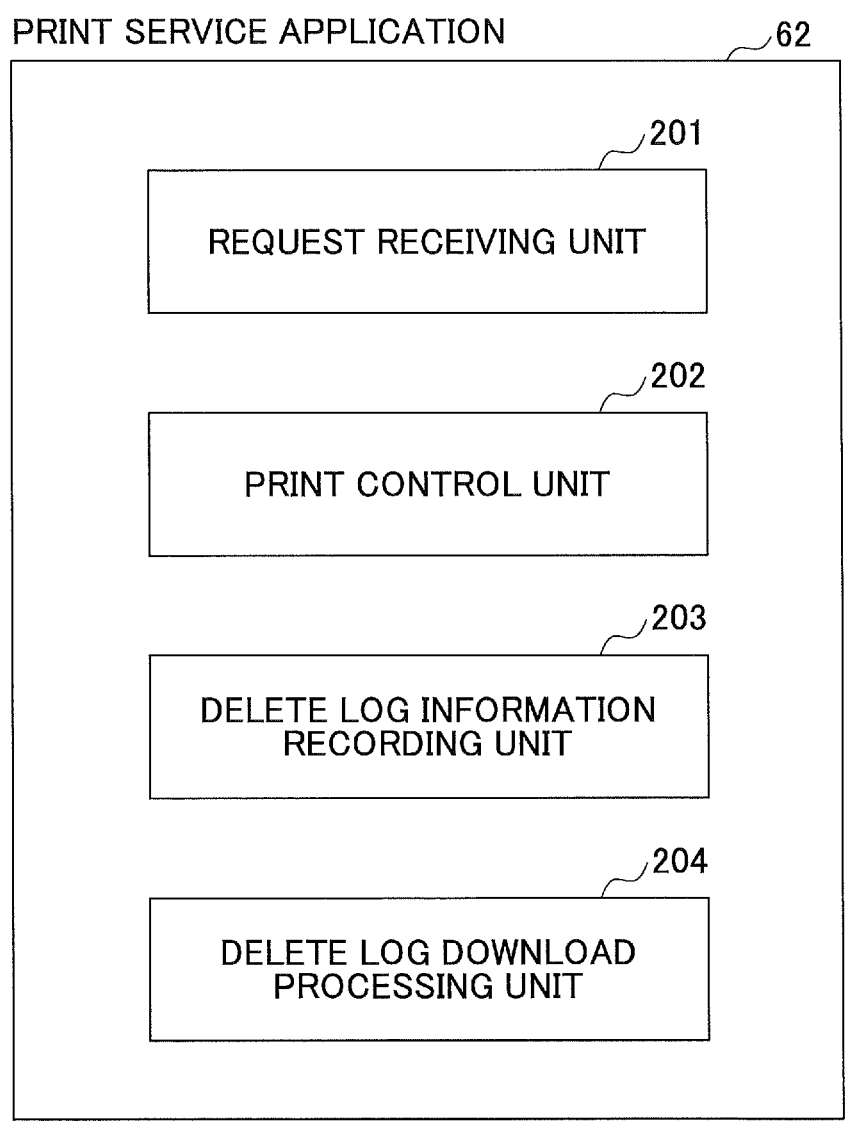
FIG. 15 is a process block diagram of an example of a print service application.

In the service providing system 2 according to the present embodiment, the download process of delete log information is realized by, for example, the print service application 62 having the process blocks as illustrated in FIG. 15. FIG. 15 is a process block diagram of an example of the print service application 62. Note that the process block diagram of FIG. 15 illustrates the process blocks necessary for describing the download process of delete log, among the process blocks included in the print service application 62.

The print service application 62 includes a request receiving unit 201, a print control unit 202, a delete log information recording unit 203, and a delete log download processing unit 204. The request receiving unit 201 receives a request from the user relevant to a print service. The print control unit 202 implements control of a process relevant to the print service.

The delete log information recording unit 203 records, as delete log information, the result of a process of deleting stored print data, among the processes relevant to a print service performed by the print control unit 202, in the data storage unit 93 of the management data storage unit 53, for example. The delete log information recorded by the delete log information recording unit 203 includes, for example, items as indicated in FIG. 16.

FIG. 16 illustrates a configuration of an example of delete log information. The delete log information of FIG. 16 includes a device ID, a print language, a time and date, an operator, a means/reason, a user name, a document name, a file size, a page number, aggregate, number of copies when storing, single-sided/double-sided when storing, color/monochrome when storing, number of copies when printing, single-sided/double-sided when printing, color/monochrome when printing, and an external authentication ID, as items.

The device ID is identification information of a device such as the image forming apparatus 12 that has made the access. The device ID is a blank space when an access is made from something other than a device. The print language is the language of the print job. The time and date expresses the time and date at which the print data has been deleted, by the time zone in the data storage unit 93. The operator expresses the user who has performed the process of deleting the print data. The means/reason expresses the reason why the print data has been deleted, among deleting the print data after printing has ended, manually deleting the print data by the user, and automatically deleting the print data when the storage period has passed.

The user name expresses the name of the user who has stored the print data. The document name expresses the document name of the print data. The file size expresses the data size of the print data. The page number expresses the number of pages of the print data. Aggregate expresses information relevant to aggregate printing, such as 2 in1.

The number of copies when storing, single-sided/double-sided when storing, and color/monochrome when storing express the number of copies when storing, double-sided information when storing, and color information when storing, respectively. The number of copies when printing, single-sided/double-sided when printing, and color/monochrome when printing express the number of copies when printing, double-sided information when printing, and color information when printing, respectively. The external authentication ID is an ID of external authentication.

Referring back to FIG. 15, the delete log download processing unit 204 performs a process of downloading the delete log information into the terminal device 11. Note that details of the process of downloading the delete log information by the delete log download processing unit 204 are described below.

Figure 17:
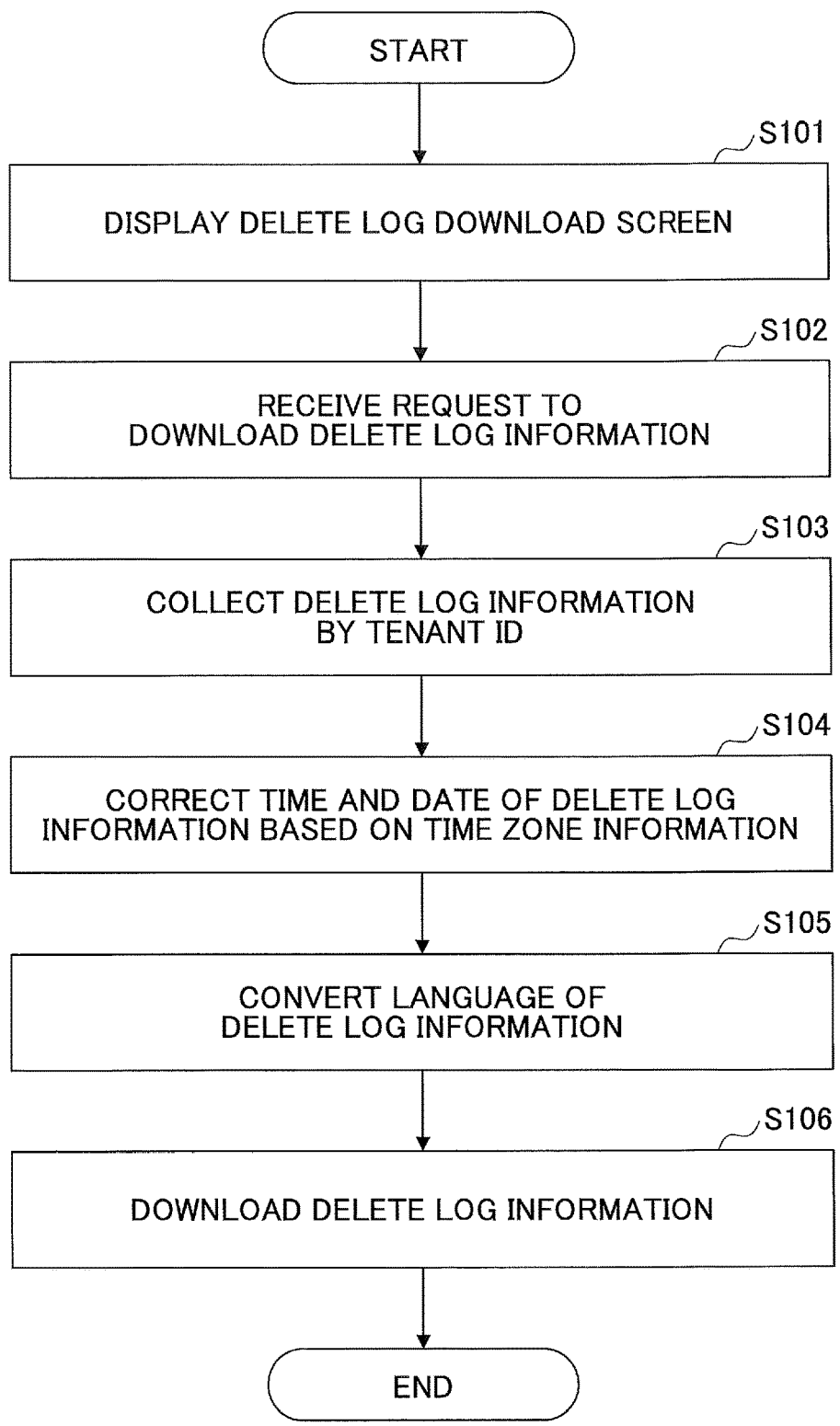
FIG. 17 is a flowchart of an example of a download process of delete log information.

In the information processing system 1 according to the present embodiment, the download process of delete log information is performed as illustrated in FIG. 17, for example. FIG. 17 is a flowchart of an example of a download process of delete log information.

In step S101, the administrator accesses the print service application 62 from the terminal device 11, and displays a delete log download screen. The delete log download screen may be displayed by using a web UI or may be displayed by using other means such as an exclusive-use tool. For example, the delete log download processing unit 204 displays a delete log download screen as illustrated in FIG. 18 on the terminal device 11.

Figure 18:
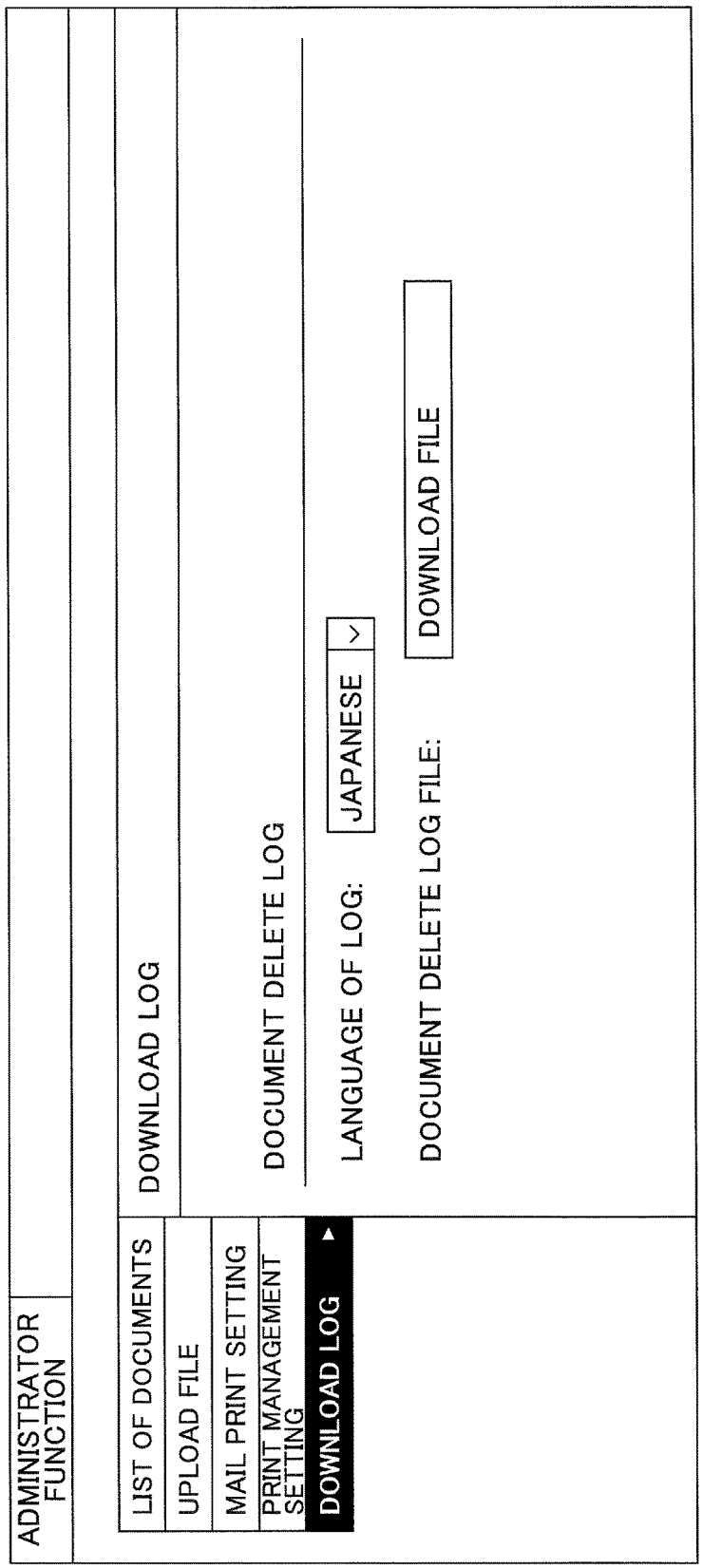
FIG. 18 is an image diagram of an example of a delete log download screen.

FIG. 18 is an image diagram of an example of the delete log download screen. The administrator is able to select the language of the delete log information and request download of the delete log information, in the delete log download screen of FIG. 18.

In step S102, the delete log download processing unit 204 receives a request to download the delete log information from the terminal device 11. In step S103, the delete log download processing unit 204 collects the delete log information from the data storage unit 93 by the tenant ID of the administrator.

For example, even when the data storage unit 93 is constituted by a plurality of image processing apparatuses, the delete log download processing unit 204 can collect the delete log information associated with the tenant ID of the administrator.

In step S104, the delete log download processing unit 204 reads the time zone information associated with the tenant ID, from the tenant information as illustrated in FIG. 5, and corrects the time and date of the delete log information based on a correction value of the time zone of the tenant. Note that the correction values of the respective time zones are managed by a table as illustrated in FIG. 19. FIG. 19 is an example of a table associating time zone information with correction values. By the process of step S104, even when the delete log download processing unit 204 has collected delete log information ranging across a plurality of time zones in step S103, it is possible to set the delete log information to match the time and date of the time zone of the tenant.

For example, even when the delete log is stored by being distributed across a plurality of data storage units 93 ranging across a plurality of time zones, the delete log download processing unit 204 is able to convert the delete log information so as to match the time and date of the time zone of the tenant.

In step S105, the delete log download processing unit 204 converts the language of the delete log information based on the language of the delete log information selected from the delete log download screen of FIG. 18. The language conversion of the delete log information performed in step S105 is performed with respect to the value of the means/reason, the value of single-sided/double-sided, and the value of color/monochrome, among the items indicated in FIG. 16, for example. In step S106, the delete log download processing unit 204 downloads the delete log information into the terminal device 11 from which the download request has been received.

The process of the flowchart of FIG. 17 indicates an example of collecting the delete log information associated with the tenant ID; however, the delete log information may be downloaded after narrowing down the delete log information according to the period, the device ID and the user name. Furthermore, the delete log download processing unit 204 may divide the delete log information according to the device ID and user name, and download the delete log information in a compressed format. Furthermore, the delete log download processing unit 204 may download the delete log information upon encrypting the delete log information.

In the process of downloading the delete log information illustrated in FIG. 17, the collecting of the delete log information is started upon receiving a download request from the administrator; however, when there are many pieces of delete log information, it takes a long time until the downloading is ended.

Figure 20:
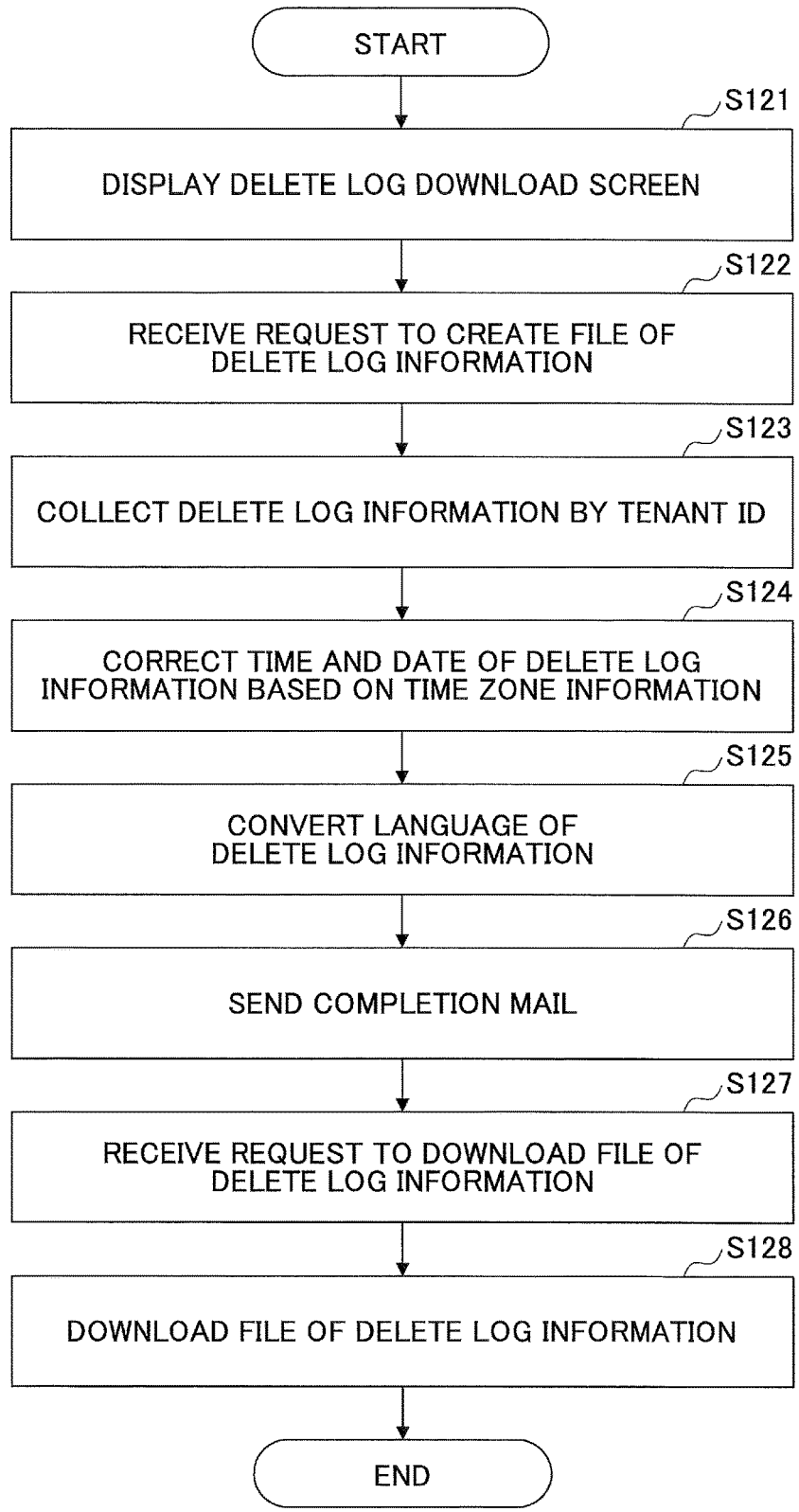
FIG. 20 is a flowchart of an example of a download process of delete log information.

Therefore, in the information processing system 1 according to the present embodiment, the process of downloading the delete log information may be performed as illustrated in FIG. 20. FIG. 20 is a flowchart of an example of a download process of delete log information. In the download process of delete log information of FIG. 20, after the collection of delete log information is ended, a download request is received from the administrator.

In step S121, the administrator accesses the print service application 62 from the terminal device 11, and displays a delete log download screen, for example, as illustrated in FIG. 21, on the terminal device 11. FIG. 21 is an image diagram of another example of a delete log download screen. The administrator is able to select a character code of the delete log information, make a file creation request of the delete log information, and make a request to download a file of the delete log information, in the delete log download screen of FIG. 21. Furthermore, in the delete log download screen of FIG. 21, the creation state of a file of the delete log information is expressed by "being created/creation completed/error".

In step S122, the delete log download processing unit 204 receives a file creation request of the delete log information, from the terminal device 11. When the file creation request of the delete log information is received, the creation state of the file of the delete log information in the delete log download screen transitions to "being created". The processes of steps S123 through S125 are the same as those of step S103 through S105 of FIG. 17, and therefore descriptions thereof are omitted.

When the creation of the file of the delete log information is completed, the creation state of the file of the delete log information in the delete log download screen transitions from "being created" to "creation completed". Furthermore, when the creation of the file of the delete log information is completed, in the delete log download screen, a "download file" button becomes effective, which is for receiving a request to download the file of the delete log information from the administrator.

In step S126, the delete log download processing unit 204 sends a completion mail indicating the completion of creating a file of the delete log information, to the mail address of the administrator. Note that whether to send a completion mail may be set, for example, by specifying on or off of the completion mail report in the delete log download screen of FIG. 21.

FIG. 22 is an image diagram of an example of a completion mail indicating the completion of creating a file of the delete log information. By receiving the completion mail of FIG. 22, the administrator is able to recognize that the creation of the file of the delete log information has been completed.

In step S127, the administrator accesses the print service application 62 from the terminal device 11, and displays the delete log download screen of FIG. 21. Then, in step S128, the administrator presses the "download file" button in the delete log download screen, to request download of the file of the delete log information.

The delete log download processing unit 204 receives a request to download the delete log information from the terminal device 11. Then, in step S128, the delete log download processing unit 204 downloads the delete log information into the terminal device 11 from which the download request has been received.

In the process of the flowchart of FIG. 20, the creation of the file of the delete log information is started upon receiving a request to create a file of the delete log information; however, the creation of the file of the delete log information may be started periodically. Note that when the creation of the file of the delete log information is started periodically, the interval at which the creation of the file of the delete log information is started is set according to a periodic creation setting, for example.

Furthermore, the process of the flowchart of FIG. 20 is an example of a process of downloading the file of the delete log information; however, information obtained by processing the delete log information may be presented to the administrator, such as the aggregate results of the delete log information. The presentation of the delete log information to the administrator is not limited to downloading; the delete log information may be displayed on a screen.

<Overview>

According to the information processing system 1 according to the present embodiment, the delete log information is collected by using the tenant ID as the key information, and therefore it is possible to provide the log information associated with the tenant ID of the service providing destination, from the service providing source.

Furthermore, the delete log information includes settings of the number of copies, single-sided/double-sided, and color/monochrome, when storing and printing. Therefore, by referring to the delete log information, the administrator can easily aggregate the print cost. For example, the administrator can easily recognize the effects of installing a new function by referring to the delete log information.

Furthermore, according to the information processing system 1 according to the present embodiment, even when a tenant such as a company operates across a plurality of time zones, it is possible to provide delete log information that has been corrected to the time and date of the time zone that is set in association with the tenant ID. Note that the time zone that is set in association with the tenant ID is the time zone information of the tenant information of FIG. 5.

According to the information processing system 1 according to the present embodiment, the delete log information can be provided upon appropriately managing the service to be provided, the user using the service, and the device by which the service is used.

According to one embodiment of the present invention, a service providing system and a log information providing method are provided, which are capable of providing log information according to the service providing destination, from the service providing source.

The service providing system and the log information providing method are not limited to the specific embodiments described herein, and variations and modifications may be made without departing from the spirit and scope of the present invention. For example, the information processing system 1 according to the present embodiment is not limited to the purpose of printing, and is not limited to the information processing system 1 for handling delete log information of the print data.

For example, the service providing system 2 providing a service to the image forming apparatus 12 and the other device 14 connected via a network, is an example of a service providing system for providing a service to a service usage device connected via a network. Furthermore, the delete log information relevant to a service provided to the image forming apparatus 12 and the other device 14, is an example of log information relevant to a service provided to the service usage device.

The tenant ID of the image forming apparatus 12 and the other device 14 is an example of organization identification information of the service usage device. The data storage unit 93 that stores delete log information in association with the tenant ID of the image forming apparatus 12 and the other device 14, is an example of at least one log information storage unit storing the log information in association with the organization identification information of the service usage device.

The management information storage unit 91 that stores the standard time of the tenant identified by the tenant ID as tenant information, is an example of an organization information storage unit storing the standard time of an organization identified by the organization identification information.

The delete log download processing unit 204 that collects the delete log information from the data storage unit 93 based on a tenant ID, corrects the time and date information of the log information by the standard time of the tenant, and subsequently provides the delete log information, is an example of a log information providing unit. The request to download the delete log information and the request to display a screen, are examples of a provision request for log information.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Patent Application No. 2014-125025, filed on Jun. 18, 2014, the entire contents of which are hereby incorporated herein by reference.

What is claimed is:

1. A service providing system for providing services to a service usage device connected via a network, the service providing system being constituted by at least one information processing apparatus for implementing various functions of the service providing system, the service providing system comprising:
one or more hardware processors; and
one or more hardware memories containing instructions, which when executed, cause the one or more hardware processors to:
store, across a plurality of data storages ranging across a plurality of time zones, delete log information relating to the services provided to the service usage device, in association with organization identification information of the service usage device;
the delete log information including information indicating history of deleting print data;
store a standard time of an organization identified by the organization identification information; the standard time indicating a geographical time zone of the organization identified by the organization identification information;
collect the stored delete log information associated with the organization identification information of the service usage device, from the plurality of data storages ranging across the plurality of time zones, based on the organization identification information;
correct, for each time zone among the plurality of time zones, first time and date information included in the delete log information to second time and date information different than the first time and date information, the first time and date information not matching the geographical time zone indicated by the standard time of the organization identified by the organization identification information, and the second time and date information matching the geographical time zone indicated by the standard time of the organization identified by the organization identification information;
subsequently provide the delete log information, with the first time and date information corrected to the second time and date information, for each time zone among the plurality of time zones, to a request source of the delete log information, as a single electronic file; and
convert content of the delete log information from a first human language into a second human language that is different than the first human language and that is specified by the request source of the delete log information, before providing the delete log information to the request source of the delete log information.

2. The service providing system according to claim 1, wherein the instructions, when executed, cause the one or more hardware processors to:
collect the stored delete log information upon receiving a creation request to create the delete log information from the request source of the delete log information, and correct the first time and date information included in the delete log information to the second time and date information different than the first time and date information, before providing the delete log information to the request source of the delete log information upon receiving a provision request to provide the delete log information from the request source of the delete log information.

3. The service providing system according to claim 2, wherein the instructions, when executed, cause the one or more hardware processors to:
collect the stored delete log information upon receiving the creation request to create the delete log information from the request source of the delete log information, correct the first time and date information included in the delete log information to the second time and date information different than the first time and date information, and subsequently report that the creating of the delete log information is completed.

4. The service providing system according to claim 1, wherein the instructions, when executed, cause the one or more hardware processors to:
collect the stored delete log information upon receiving a creation request to create the delete log information from the request source of the delete log information, and correct the first time and date information included in the delete log information to the second time and date information different than the first time and date information, before providing the delete log information to the request source of the delete log information upon receiving a provision request to provide the delete log information from the request source of the delete log information.

5. The service providing system according to claim 4, wherein the instructions, when executed, cause the one or more hardware processors to:

collect the stored delete log information upon receiving the creation request to create the delete log information from the request source of the delete log information, correct the first time and date information included in the delete log information to the second time and date information different than the first time and date information, and subsequently report that the creating of the delete log information is completed.

6. The service providing system according to claim 1, wherein the instructions, when executed, cause the one or more hardware processors to:
collect the stored delete log information periodically based on a setting, and correct the first time and date information included in the delete log information to the second time and date information different than the first time and date information, before providing the delete log information to the request source of the delete log information.

7. The service providing system according to claim 1, wherein the instructions, when executed, cause the one or more hardware processors to:
collect the stored delete log information periodically based on a setting, and correct the first time and date information included in the delete log information to the second time and date information different than the first time and date information, before providing the delete log information to the request source of the delete log information.

8. The service providing system according to claim 1, wherein the instructions, when executed, cause the hardware processor to:
provide the delete log information to the request source of the delete log information by downloading the delete log information or displaying the delete log information on a screen.

9. The service providing system according to claim 1, wherein the standard time specifies a difference in hours from Coordinated Universal Time.

10. The service providing system according to claim 1, wherein the instructions, when executed, cause the one or more hardware processors to store the organization identification information in association with time zone information that indicates the geographical time zone, and store second organizational identification information in association with second time zone information that indicates a second geographical time zone different than the geographical time zone; and
wherein the second organization identification information identifies a second organization different than the organization.

11. The service providing system according to claim 1, wherein the correction of the first time and date information included in the delete log information to the second time and date information is based on a correction value of a time zone of the organization identified by the organization identification information.

12. A delete log information providing method executed in a service providing system for providing services to a service usage device connected via a network, the service providing system being constituted by at least one information processing apparatus for implementing various functions of the service providing system, the delete log information providing method comprising:
storing, across a plurality of log information storages ranging across a plurality of time zones, delete log information relating to the services provided to the service usage device, in association with organization identification information of the service usage device; the delete log information including information indicating history of deleting print data; and
collecting the delete log information associated with the organization identification information of the service usage device, from the plurality of log information storages ranging across the plurality of time zones, based on the organization identification information, referring to an organization information storage storing a standard time of an organization identified by the organization identification information, the standard time indicating a geographical time zone of the organization identified by the organization identification information, correcting, for each time zone among the plurality of time zones, first time and date information included in the delete log information to second time and date information different than the first time and date information, the first time and date information not matching the geographical time zone indicated by the standard time of the organization identified by the organization identification information, and the second time and date information matching the geographical time zone indicated by the standard time of the organization identified by the organization identification information, and subsequently providing the delete log information, with the first time and date information corrected to the second time and date information, for each time zone among the plurality of time zones, to a request source of the delete log information, as a single electronic file; wherein the providing includes converting content of the delete log information from a first human language into a human language that is different than the first human language and that is specified by the request source of the delete log information, and subsequently providing the delete log information to the request source of the delete log information.

13. The delete log information providing method according to claim 12, wherein the collecting includes collecting the delete log information from the delete log information storage upon receiving a creation request to create the delete log information from the request source of the delete log information, correcting the first time and date information included in the delete log information to the second time and date information different than the first time and date information, and subsequently providing the delete log information to the request source of the delete log information upon receiving a provision request to provide the delete log information from the request source of the delete log information.

14. The delete log information providing method according to claim 13, wherein the collecting includes collecting the delete log information from the delete log information storage upon receiving the creation request to create the delete log information from the request source of the delete log information, correcting the first time and date information included in the delete log information to the second time and date information different than the first time and date information, and subsequently reporting that the creating of the delete log information is completed.

15. The delete log information providing method according to claim 12, wherein the collecting includes collecting the delete log information from the delete log information storage upon receiving a creation request to create the delete log information from the request source of the delete log information, correcting the first time and date information included in the delete log information to the second time and date information different than the first time and date information, and subsequently providing the delete log information to the request source of the delete log information upon receiving a provision request to provide the delete log information from the request source of the delete log information.

16. The delete log information providing method according to claim 15, wherein the collecting includes collecting the delete log information from the log information storage upon receiving the creation request to create the delete log information from the request source of the delete log information, correcting the first time and date information included in the delete log information to the second time and date information different than the first time and date information, and subsequently reporting that the creating of the delete log information is completed.

17. The delete log information providing method according to claim 12, wherein the collecting includes collecting the delete log information from the log information storage periodically based on a setting, correcting the first time and date information included in the delete log information to the second time and date information different than the first time and date information, and subsequently providing the delete log information to the request source of the delete log information.

18. The delete log information providing method according to claim 12, wherein the collecting includes collecting the delete log information from the log information storage periodically based on a setting, correcting the first time and date information included in the delete log information to the second time and date information different than the first time and date information, and subsequently providing the delete log information to the request source of the delete log information.

19. A non-transitory computer-readable recording medium storing a program that causes a computer to execute a process performed in a service providing system for providing services to a service usage device connected via a network, the service providing system being constituted by at least one information processing apparatus for implementing various functions of the service providing system, the process comprising:

collecting delete log information associated with organization identification information of the service usage device, from a plurality of log information storages ranging across a plurality of time zones, based on the organization identification information, the delete log information relating to the services provided to the service usage device, the delete log information being stored, across the plurality of log information storages ranging across the plurality of time zones, in association with the organization identification information of the service usage device; the delete log information including information indicating history of deleting print data; and referring to an organization information storage storing a standard time of an organization identified by the organization identification information, the standard time indicating a geographical time zone of the organization identified by the organization identification information, correcting, for each time zone among the plurality of time zones, first time and date information included in the delete log information to second time and date information different than the first time and date information, the first time and date information not matching the geographical time zone indicated by the standard time of the organization identified by the organization identification information, and the second time and date information matching the geographical time zone indicated by the standard time of the organization identified by the organization identification information, and subsequently providing the delete log information, with the first time and date information corrected to the second time and date information, for each time zone among the plurality of time zones, to a request source of the delete log information, as a single electronic file; wherein the providing includes converting content of the delete log information from a first human language into a human language that is different than the first human language and that is specified by the request source of the delete log information, and subsequently providing the delete log information to the request source of the delete log information.

* * * * *